(12) United States Patent
Friend et al.

(10) Patent No.: US 8,321,511 B1
(45) Date of Patent: Nov. 27, 2012

(54) SYSTEM AND METHOD FOR FULL WIRELESS SYNCHRONIZATION OF A DATA PROCESSING APPARATUS WITH A MESSAGING SYSTEM

(75) Inventors: John Friend, Los Altos, CA (US); Michael Belshe, Sunnyvale, CA (US); Roger Collins, Novato, CA (US); Mike Bennett, Brisbane, CA (US)

(73) Assignee: Motorola Mobility LLC, Libertyville, IL (US)

( * ) Notice: Subject to any disclaimer, the term of this patent is extended or adjusted under 35 U.S.C. 154(b) by 1531 days.

(21) Appl. No.: 10/348,281

(22) Filed: Jan. 21, 2003

Related U.S. Application Data

(63) Continuation of application No. 10/109,928, filed on Mar. 29, 2002, now Pat. No. 7,243,163, and a continuation-in-part of application No. 09/924,283, filed on Aug. 7, 2001, now Pat. No. 7,155,483.

(51) Int. Cl.
  *G06F 15/16* (2006.01)
(52) U.S. Cl. ...................................................... 709/206
(58) Field of Classification Search .................. 709/201, 709/212, 219, 246, 248, 203, 204, 206; 455/3, 455/2, 42.1
  See application file for complete search history.

(56) References Cited

U.S. PATENT DOCUMENTS

| | | |
|---|---|---|
| 4,682,150 A | 7/1987 | Mathes et al. |
| 5,049,881 A | 9/1991 | Gibson et al. |
| 5,086,502 A | 2/1992 | Malcolm |
| 5,115,392 A | 5/1992 | Takamoto et al. |
| 5,126,739 A | 6/1992 | Whiting et al. |
| 5,159,592 A | 10/1992 | Perkins |
| 5,321,840 A | 6/1994 | Ahlin et al. |
| 5,469,161 A | 11/1995 | Bezek |
| 5,521,597 A * | 5/1996 | Dimitri ........................... 341/51 |
| 5,553,281 A | 9/1996 | Brown et al. |
| 5,559,800 A | 9/1996 | Mousseau et al. |
| 5,563,595 A | 10/1996 | Strohacker |
| 5,666,530 A | 9/1997 | Clark |
| 5,715,387 A | 2/1998 | Barnstijn et al. |
| 5,727,159 A | 3/1998 | Kikinis |
| 5,727,202 A | 3/1998 | Kucala |
| 5,729,735 A | 3/1998 | Meyering |
| 5,760,716 A | 6/1998 | Mathews et al. |
| 5,771,010 A | 6/1998 | Masenas |
| 5,790,974 A | 8/1998 | Tognazzini |
| 5,793,970 A | 8/1998 | Fakes et al. |

(Continued)

FOREIGN PATENT DOCUMENTS
EP         0617373         9/1994
(Continued)

OTHER PUBLICATIONS

PCT Search Report, PCT/US 02/21548, Nov. 25, 2002, 4 pps.
Hild et al., "Mobilizing Applications", IEEE Personal Communications, Oct. 1997, XP-000721303,pp. 26-34.
PCT Search Report, PCT/US 02/21596, Oct. 24, 2002, 5 pps.

(Continued)

*Primary Examiner* — Benjamin R Bruckart
(74) *Attorney, Agent, or Firm* — Blakely, Sokoloff, Taylor & Zafman, LLP

(57) ABSTRACT

A system is disclosed in which a data processing device is completely synchronized with a messaging service. One embodiment of the system comprises a wireless data processing device; a messaging service to maintain messages and other information on behalf of a user; and synchronization logic for maintaining synchronization of the messages and other information between the wireless device and the messaging service.

30 Claims, 22 Drawing Sheets

U.S. PATENT DOCUMENTS

| | | | |
|---|---|---|---|
| 5,802,312 A | 9/1998 | Lazaridis et al. | |
| 5,813,016 A | 9/1998 | Sumimoto | |
| 5,838,923 A | 11/1998 | Lee et al. | |
| 5,841,376 A | 11/1998 | Hayashi | |
| 5,870,610 A | 2/1999 | Beyda | |
| 5,875,329 A | 2/1999 | Shan | |
| 5,878,434 A | 3/1999 | Draper et al. | |
| 5,903,230 A | 5/1999 | Masenas | |
| 5,930,471 A | 7/1999 | Milewski et al. | |
| 5,961,590 A | 10/1999 | Mendez et al. | |
| 5,974,238 A | 10/1999 | Chase, Jr. | |
| 5,987,464 A | 11/1999 | Schneider | |
| 6,003,089 A | 12/1999 | Shaffer et al. | |
| 6,023,708 A | 2/2000 | Mendez et al. | |
| 6,034,621 A | 3/2000 | Kaufman | |
| 6,052,735 A | 4/2000 | Ulrich et al. | |
| 6,065,017 A | 5/2000 | Barker | |
| 6,085,185 A | 7/2000 | Matsuzawa et al. | |
| 6,104,392 A | 8/2000 | Shaw et al. | |
| 6,111,707 A | 8/2000 | Buddecke et al. | |
| 6,151,606 A | 11/2000 | Mendez | |
| 6,182,117 B1 | 1/2001 | Christie | |
| 6,188,695 B1 | 2/2001 | Przybysz | |
| 6,216,157 B1 | 4/2001 | Vishwanath et al. | |
| 6,218,970 B1 | 4/2001 | Jaquette | |
| 6,219,694 B1 | 4/2001 | Lazaridis et al. | |
| 6,226,618 B1 | 5/2001 | Downs et al. | |
| 6,259,891 B1 | 7/2001 | Allen | |
| 6,275,848 B1 | 8/2001 | Arnold | |
| 6,279,001 B1 | 8/2001 | DeBettencourt et al. | |
| 6,304,881 B1 * | 10/2001 | Halim et al. | 707/204 |
| 6,310,889 B1 | 10/2001 | Parsons et al. | |
| 6,330,618 B1 | 12/2001 | Hawkins et al. | |
| 6,343,299 B1 | 1/2002 | Huang et al. | |
| 6,347,340 B1 * | 2/2002 | Coelho et al. | 709/246 |
| 6,360,272 B1 | 3/2002 | Lincke et al. | |
| 6,384,850 B1 | 5/2002 | McNally et al. | |
| 6,393,434 B1 | 5/2002 | Huang et al. | |
| 6,396,482 B1 | 5/2002 | Griffin et al. | |
| 6,401,136 B1 | 6/2002 | Britton et al. | |
| 6,430,601 B1 | 8/2002 | Eldridge et al. | |
| 6,449,622 B1 | 9/2002 | LaRue et al. | |
| 6,457,062 B1 | 9/2002 | Pivowar et al. | |
| 6,460,055 B1 | 10/2002 | Midgley et al. | |
| 6,463,463 B1 | 10/2002 | Godfrey et al. | |
| 6,463,464 B1 | 10/2002 | Lazaridis et al. | |
| 6,477,543 B1 | 11/2002 | Huang et al. | |
| 6,505,055 B1 | 1/2003 | Kahn et al. | |
| 6,535,892 B1 | 3/2003 | LaRue et al. | |
| 6,571,245 B2 | 5/2003 | Huang et al. | |
| 6,604,236 B1 | 8/2003 | Draper et al. | |
| 6,615,253 B1 * | 9/2003 | Bowman-Amuah | 709/219 |
| 6,625,621 B2 | 9/2003 | Tan et al. | |
| 6,636,873 B1 | 10/2003 | Carini et al. | |
| 6,640,244 B1 * | 10/2003 | Bowman-Amuah | 709/207 |
| 6,654,746 B1 | 11/2003 | Wong et al. | |
| 6,658,167 B1 | 12/2003 | Lee et al. | |
| 6,671,757 B1 | 12/2003 | Multer et al. | |
| 6,675,203 B1 | 1/2004 | Herrod et al. | |
| 6,694,335 B1 | 2/2004 | Hopmann et al. | |
| 6,697,458 B1 | 2/2004 | Kunjibettu | |
| 6,701,378 B1 | 3/2004 | Gilhuly et al. | |
| 6,721,787 B1 | 4/2004 | Hiscock | |
| 6,721,871 B2 | 4/2004 | Piispanen et al. | |
| 6,757,698 B2 | 6/2004 | McBride et al. | |
| 6,779,019 B1 | 8/2004 | Mousseau et al. | |
| 6,792,085 B1 | 9/2004 | Rigaldies et al. | |
| 6,810,405 B1 | 10/2004 | LaRue et al. | |
| 6,874,029 B2 | 3/2005 | Hutcheson et al. | |
| 6,874,037 B1 | 3/2005 | Abram et al. | |
| 6,901,415 B2 | 5/2005 | Thomas et al. | |
| 6,931,454 B2 | 8/2005 | Deshpande et al. | |
| 6,934,766 B1 | 8/2005 | Russell | |
| 6,941,348 B2 | 9/2005 | Petry et al. | |
| 6,941,349 B2 | 9/2005 | Godfrey et al. | |
| 6,954,789 B2 | 10/2005 | Dietz et al. | |
| 6,973,299 B2 | 12/2005 | Apfel | |
| 6,983,308 B1 | 1/2006 | Oberhaus et al. | |
| 7,003,776 B2 | 2/2006 | Sutherland | |
| 7,085,809 B2 | 8/2006 | Mori et al. | |
| 7,092,699 B1 | 8/2006 | Hefter | |
| 7,136,934 B2 | 11/2006 | Carter et al. | |
| 7,139,555 B2 | 11/2006 | Apfel | |
| 7,149,813 B2 | 12/2006 | Flanagin et al. | |
| 7,155,483 B1 | 12/2006 | Friend et al. | |
| 7,191,218 B1 | 3/2007 | Innes | |
| 7,243,163 B1 | 7/2007 | Friend et al. | |
| 7,287,097 B1 | 10/2007 | Friend et al. | |
| 7,743,119 B2 | 6/2010 | Friend et al. | |
| 2001/0004744 A1 | 6/2001 | Lazaridis et al. | |
| 2001/0005864 A1 | 6/2001 | Mousseau et al. | |
| 2001/0010059 A1 | 7/2001 | Burman et al. | |
| 2001/0034654 A1 | 10/2001 | Vigil et al. | |
| 2001/0054115 A1 | 12/2001 | Ferguson et al. | |
| 2002/0013853 A1 | 1/2002 | Baber et al. | |
| 2002/0016818 A1 | 2/2002 | Kirani et al. | |
| 2002/0019225 A1 | 2/2002 | Miyashita | |
| 2002/0032722 A1 | 3/2002 | Baynes et al. | |
| 2002/0046286 A1 | 4/2002 | Caldwell et al. | |
| 2002/0119793 A1 | 8/2002 | Hronek et al. | |
| 2002/0120696 A1 | 8/2002 | Mousseau et al. | |
| 2002/0146240 A1 | 10/2002 | Ogawa et al. | |
| 2002/0160773 A1 | 10/2002 | Gresham et al. | |
| 2003/0046434 A1 | 3/2003 | Flanagin et al. | |
| 2003/0050046 A1 | 3/2003 | Conneely et al. | |
| 2003/0069842 A1 | 4/2003 | Kight et al. | |
| 2003/0081621 A1 | 5/2003 | Godfrey et al. | |
| 2003/0097381 A1 | 5/2003 | Detweiler et al. | |
| 2004/0054739 A1 | 3/2004 | Friend et al. | |
| 2004/0105423 A1 | 6/2004 | Koehler et al. | |
| 2004/0109436 A1 | 6/2004 | Vargas et al. | |
| 2004/0213283 A1 | 10/2004 | Ohkubo et al. | |
| 2005/0148356 A1 * | 7/2005 | Ferguson et al. | 455/502 |
| 2007/0239898 A1 | 10/2007 | Friend et al. | |
| 2007/0266107 A1 | 11/2007 | Friend et al. | |

FOREIGN PATENT DOCUMENTS

| | | |
|---|---|---|
| EP | 0666651 A2 | 8/1995 |
| EP | 0736989 | 10/1996 |
| EP | 0909037 A1 | 4/1999 |
| EP | 0917077 A2 | 5/1999 |
| EP | 1014629 A2 | 6/2000 |
| EP | 1014629 A3 | 11/2001 |
| JP | 1995182263 A | 7/1995 |
| JP | 1998269125 A | 10/1998 |
| JP | 1999136365 A | 5/1999 |
| JP | 2001076040 A | 3/2001 |
| JP | 2001339422 A | 12/2001 |
| WO | WO-9945484 | 9/1999 |
| WO | 0067158 | 11/2000 |
| WO | WO-01/78342 | 10/2001 |
| WO | WO 01/78342 A2 | 10/2001 |
| WO | 0219626 | 3/2002 |

OTHER PUBLICATIONS

"EP Search Report", PCT/CA 01/ 00492, 4 pages.

United States Patent and Trademark Office, "Non-Final Rejection" for U.S. Appl. No. 10/348,271, Oct. 19, 2004, 11 pages.

United States Patent and Trademark Office, "Non-Final Rejection" for U.S. Appl. No. 10/400,979, Aug. 10, 2007. 10 pages.

United States Patent and Trademark Office, "Final Reject" for U.S. Appl. No. 09/924,283, Sep. 7, 2005, 18 pages.

Japanese Patent Office, "Notification of Reason(s) for Refusal" for Application No. 2003-581023, Apr. 4, 2011, 14 pages.

Murakami, "The Latest Internet Technology: The Fifth, Next-Generation Mail Protocol: IMAP4 (Internet Message Access Protocol)", INTERNET Magazine, Apr. 1, 1997, pp. 352-55, No. 27, Impress Inc.

K. Ando, "Reconsideration for Email System, Available to Mobiles, Convenient IMAP4; Where the Standard Technology is Being Developed, Easy Access to Web Mails", Nikkei Internet Technology, Aug. 22 1999, pp. 76-79: No. 26, Nikkei BP Corp.

* cited by examiner

Header Info 305 {
From: "Smith, John" <jsmith@bstz.com> on 04/30/2001 11:25:21 PM
To: "Webster, Tom" <thomas_webster@bstz.com>, "Collins, Roger" <rcollins@good.com>
Cc: "'Watson, Mark'" <marky@good.com>, "O'Rourke, Rob" <o'rourke@good.com>, "Taylor, >Ed" <ed_taylor@bstz.com>
Subject: Patent Issues
}

Text 310 {
Enclosed are the agreements we need to review at our meeting. We will be required to sign them to participate in the NU-2 standards committee.
*JS*

John Smith
Blakely, Sokoloff, Taylor & Zafman LLP
1279 Oakmead Parkway
Sunnyvale, CA 94085-4040
Tel: 408.720.8300     ← Electronic Signature 315
Fax: 408.720.9397

CONFIDENTIALITY NOTICE
This electronic message and its accompanying attachments (if any) contain information from the law firm of Blakely Sokoloff Taylor & Zafman LLP that is confidential and/or subject to attorney-client privilege. If you are not the intended recipient, be aware that any disclosure, copying, distribution, or use of the contents of this information is prohibited. If you have received this message in error, please notify the above attorney by telephone immediately.
}

Message 300

 - Agreements.doc } Attachment 320

FIG. 3a

Header Info 350
- To: "Collins, Roger" <rcollins@good.com>
- From: "Webster, Tom" <thomas_webster@bstz.com>
- cc: "Smith, John" <jsmith@good.com>, "'Watson, Mark'" <marky@good.com>, "O'Rourke, Rob" <o'rourke@good.com>, "Taylor, Ed" <ed_taylor@bstz.com>
- Subject: RE: Patent Issues

Text 355
Roger,
The license-back provisions in these agreements do not look like a problem to me. We can discuss the reasons why at the meeting.
--Tom

Message 301

-----Original Message-----
From: "Collins, Roger" <rcollins@good.com>
Sent: Tuesday, May 01, 2001 9:55 AM
To: "Webster, Tom" <thomas_webster@bstz.com>, "Smith, John" <jsmith@good.com>
Cc: "Watson, Mark'" <marky@good.com>, "O'Rourke, Rob" <o'rourke@good.com>, "Taylor, Ed" <ed_taylor@bstz.com>
Subject: RE: Patent Issues Tom, in the meantime, it would be helpful if you could identify whether Good is likely to have any patents or patent applications that might fall within the scope of the various license back provisions in any of these agreements.

> From: "Smith, John" <jsmith@bstz.com> on 04/30/2001 11:25:21 PM
> To: "Webster, Tom" <thomas_webster@bstz.com>, "Collins, Roger"
> <rcollins@good.com>
> Cc: "'Watson, Mark'" <marky@good.com>, "O'Rourke, Rob"
> <o'rourke@good.com>, "Taylor, >Ed" <ed_taylor@bstz.com>
> Subject: Patent Issues > Enclosed are the agreements we need to review at our meeting. We will
> be required to sign them to participate in the NU-2 standards committee.
> *JS*

> John Smith
> Blakely, Sokoloff, Taylor & Zafman LLP
> 1279 Oakmead Parkway
> Sunnyvale, CA 94085-4040
> Tel: 408.720.8300
> Fax: 408.720.9397

> CONFIDENTIALITY NOTICE
> This electronic message and its accompanying attachments (if any) contain information
> from the law firm of Blakely Sokoloff Taylor & Zafman LLP that is confidential and/or
> subject to attorney-client privilege. If you are not the intended recipient, be aware that
> any disclosure, copying, distribution, or use of the contents of this information is
> prohibited. If you have received this message in error, please notify the above attorney
> by telephone immediately.

 - Agreements.doc  Attachment 320

Message 302

FIG. 3c

| Symbol | Probability | Code Word |
|---|---|---|
| @good.com | .2 | 00 |
| (408) 720- | .1 | 10 |
| (650) | .05 | 11 |
| @bstz.com | .05 | 010 |
| 94086 | .04 | 011 |

Code Word Table

*Fig. 7*

SYSTEM AND METHOD FOR FULL WIRELESS SYNCHRONIZATION OF A DATA PROCESSING APPARATUS WITH A MESSAGING SYSTEM

PRIORITY

Cross Reference to Related Applications

This application is a continuation application of prior application Ser. No. 10/109,928, filed Mar. 29, 2002 now U.S. Pat. No. 7,243,163, entitled "A System and Method for Full Wireless Synchronization of a Data Processing Apparatus with a Messaging Service" which is assigned to the assignee of the present application.

This application is a continuation-in-part of U.S. Application entitled APPARATUS AND METHOD FOR CONSERVING BANDWIDTH BY BATCH PROCESSING DATA TRANSACTIONS, Ser. No. 09/924,283, filed Aug. 7, 2001 now U.S. Pat. No. 7,155,483.

BACKGROUND

1. Field of the Invention

This invention relates generally to the field of network data services. More particularly, the invention relates to an apparatus and method for synchronizing a wireless data processing device with a wireless messaging service.

2. Description of the Related Art

A variety of wireless data processing devices have been introduced over the past several years. These include wireless personal digital assistants ("PDAs") such as the Palm® VIIx handheld, cellular phones equipped with data processing capabilities (e.g., those which include wireless application protocol ("WAP") support), and, more recently, wireless messaging devices such as the Blackberry™ wireless pager developed by Research In Motion ("RIM").™

Personal digital assistants such as the Palm devices typically provide only limited wireless messaging capabilities (e.g., instant messaging and basic Internet access). For example, these devices typically require a user to manually establish a connection to the Internet via an Internet Service Provider ("ISP") or to a corporate server to check e-mail messages.

Although corporate messaging systems such as the RIM Blackberry provide more comprehensive messaging capabilities, there are significant limitations to these systems. Specifically, these systems employ e-mail "redirection" or "forwarding" techniques in which messages are redirected to the wireless device only if certain conditions are met. These conditions, referred to as "redirection events," may include, for example, an indication that the user is not working at his corporate desktop (e.g., removal of the wireless device from the desktop cradle, a screen saver firing on the desktop, . . . etc) or a manual redirection command initiated by the user (e.g., via the wireless device or the corporate desktop). One such message redirection system is described in U.S. Pat. No. 6,219,694 ("System and Method for Pushing Information From a Host System to a Mobile Data Communication Device Having a Shared Electronic Address").

As a result, these systems are (as a practical matter) incapable of providing complete synchronization between the wireless device and the corporate e-mail database. For example, because messages are only redirected to the wireless device under certain conditions (e.g., following a redirection event), at any given point in time, the wireless device may contain an incomplete set of e-mail data. Moreover, even when messages are actively being forwarded to the wireless device, the e-mail data stored at the wireless device and the e-mail database are not truly synchronized. For example, certain types of transactions performed on the wireless device, such as an indication that a message has been viewed by the user, message deletions, movement of messages from one folder to another, . . . etc., are not updated at the e-mail service wirelessly.

Moreover, only basic e-mail functions such as sending and receiving messages may be controlled at the wireless device. More advanced e-mail management functions must be set at the user's desktop (e.g., configuring e-mail filters, outgoing e-mail signatures, security settings such as passwords, . . . etc).

In addition, prior messaging systems require a corporate desktop to which the device must be attached when the user is in the office. The problem with this is not merely that a corporate desktop is required, but also that the corporate desktop must be configured with software and a proprietary "cradle" that allows it to communicate directly to the wireless device.

Accordingly, what is needed is a system and method for providing complete synchronization and management between a wireless device and a messaging service (e.g., a corporate e-mail account). What is also needed is a wireless apparatus for receiving and sending e-mail messages which does not require a corporate desktop or any software to be installed and executed on the corporate desktop.

SUMMARY

A system is disclosed in which a data processing device is completely synchronized with a messaging service. One embodiment of the system comprises a wireless data processing device; a messaging service to maintain messages and other information on behalf of a user; and synchronization logic for maintaining synchronization of the messages and other information between the wireless device and the messaging service.

BRIEF DESCRIPTION OF THE DRAWINGS

A better understanding of the present invention can be obtained from the following detailed description in conjunction with the following drawings, in which:

FIGS. 3a-c illustrate an exemplary sequence of related e-mail messages.

FIG. 7 illustrates a code word table employed to compress data according to one embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Figure 1:
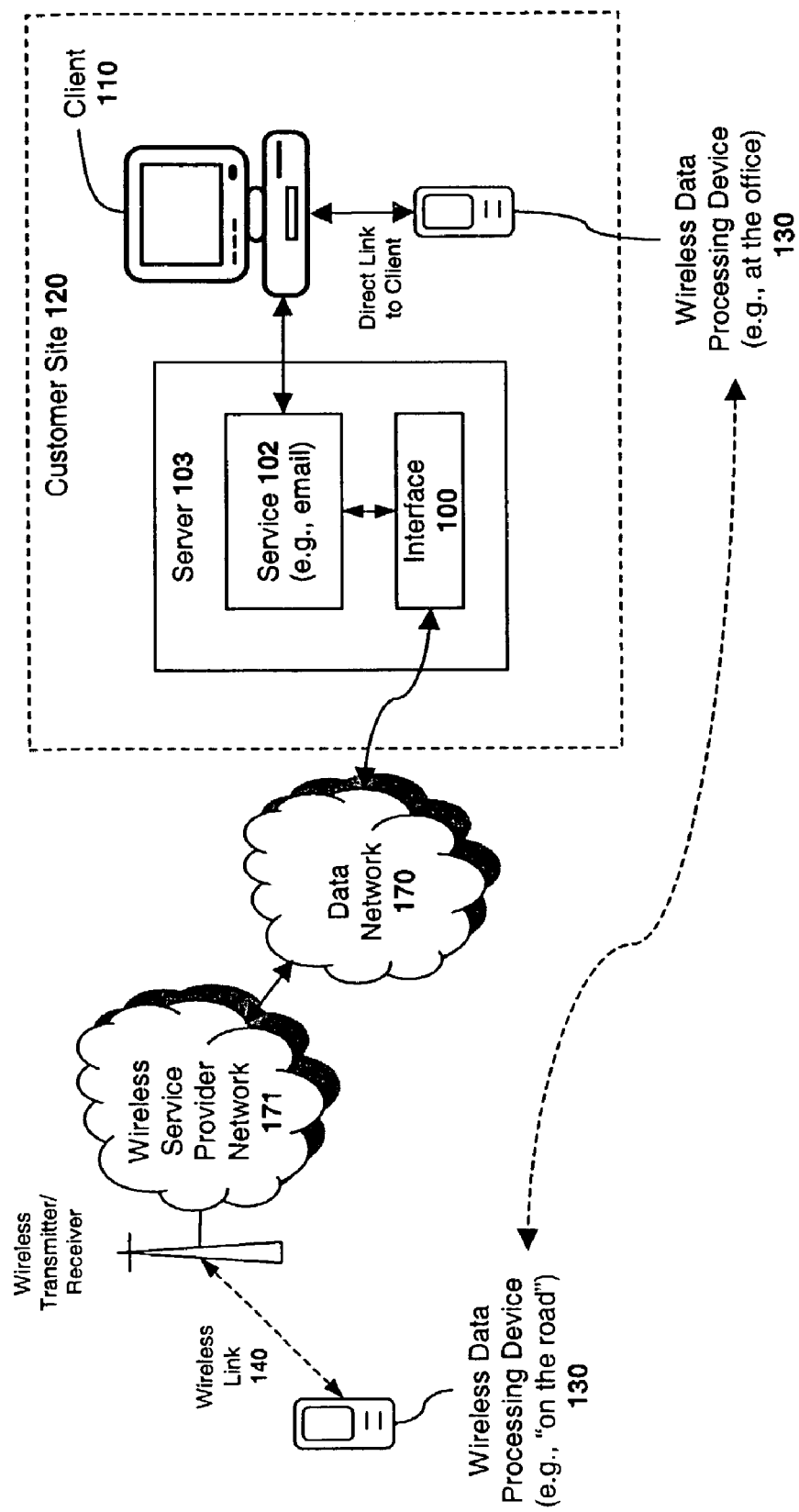
FIG. 1 illustrates an exemplary network architecture used to implement elements of the present invention.

FIG. 1 illustrates one embodiment of a network architecture for implementing the compression techniques described herein. The "customer site" 120 illustrated in FIG. 1 may be any local-area or wide-area network over which a plurality of servers 103 and clients 110 communicate. For example, the customer site may include all servers and clients maintained by a single corporation. The servers 103 may be configured to provide a variety of different messaging and groupware services 102 to network users (e.g., e-mail, instant messaging, calendaring, . . . etc). In one embodiment, these services are provided by Microsoft Exchange.™ However, the underlying principles of the invention are not limited to any particular messaging/groupware platform.

In one embodiment of the invention, an interface 100 forwards data objects maintained by the service 102 (e.g., e-mail messages, instant messages, calendar data, . . . etc) to a plurality of wireless data processing devices (represented in FIG. 1 by wireless device 130) via an external data network 170 and/or a wireless service provider network 171. For example, if the service 102 includes an e-mail database, the interface 100 transmits any new e-mails which arrive in a user's mailbox on the service 102 to the user's wireless data processing device 130 (over the network(s) 170 and/or 171). Alternatively, or in addition, the service 102 may provide the e-mail to the user's local computer (e.g., client 110) upon request (i.e., so that the user will receive the e-mail on his/her wireless device 130 when out of the office and on his/her personal computer 110 when in the office). Conversely, e-mail messages sent from the user's wireless data processing device 130 are transmitted to the service 102 via the interface 100.

In one embodiment, the interface 100 is a software module adapted to work with the particular service 120. It should be noted, however, that the interface 100 may be implemented in hardware or any combination of hardware and software while still complying with the underlying principles of the invention.

In one embodiment, the external data network 170 is comprised of a plurality of servers/clients (not shown) and other networking hardware (e.g., routers, hubs, . . . etc) for transmitting data between the interface 100 and the wireless devices 130. In one embodiment, the interface 100 encapsulates data in one or more packets containing an address identifying the wireless devices 130 (e.g., such as a 24-bit Mobitex Access Number ("MAN #")). The external data network 170 transmits the packets to a wireless service provider network 171 which, in turn, transmits the packets (or the data contained therein) over a wireless communication link to the wireless device 130. In one embodiment, the wireless service provider network is a 2-way paging network. However, various other network types may be employed (e.g., CDMA 2000, PCS, . . . etc) while still complying with the underlying principles of the invention.

It should be noted that the network service provider network 171 and the external data network 170 (and associated interface 100) may be owned/operated by the same organization or, alternatively, the owner/operator of the external data network 170 may lease wireless services from the wireless service provider network. The underlying principles of the invention are not limited to any particular service arrangement.

In one embodiment of the invention, the service 102 (e.g., the e-mail database) is fully synchronized with the wireless data processing device 130. Thus, any actions performed on the wireless device 130 are automatically updated on the service 102 and any transactions occurring at the service 102 are automatically reflected on the device 130. Synchronization updates of this type may include but are not limited to device configuration modifications, calendar updates, e-mail message updates, instant messages, to-do list updates and/or any other type of personal information management transactions or corporate data management transactions (hereinafter "message transactions"). As one example, when a user views an e-mail message using the device 130, an indication that the user viewed the message is transmitted to the service 102 (via the interface 100). Accordingly, if the user subsequently connects to e-mail via a client 110, the e-mail will appear as having already been viewed. Other actions such as message deletions, filing activities (e.g., moving a message to a particular folder), message responses, meeting confirmations/additions . . . etc, will automatically be reflected in the service 102, thereby providing complete synchronization between the service 102, the device 130 and/or the client 110 (if one is being used).

Current messaging systems do not offer complete wireless device synchronization. As such, these systems require that the user have a desktop computer with a "cradle" to which the device is attached to received certain types of synchronization updates. One reason for this is that prior systems process message transactions in a relatively inefficient manner and employ only limited compression techniques, thereby making complete synchronization impractical. As such, in order to realize complete wireless synchronization, embodiments of the invention employ one or more of the following compression and/or message processing techniques.

State-Based Compression

Figure 2:
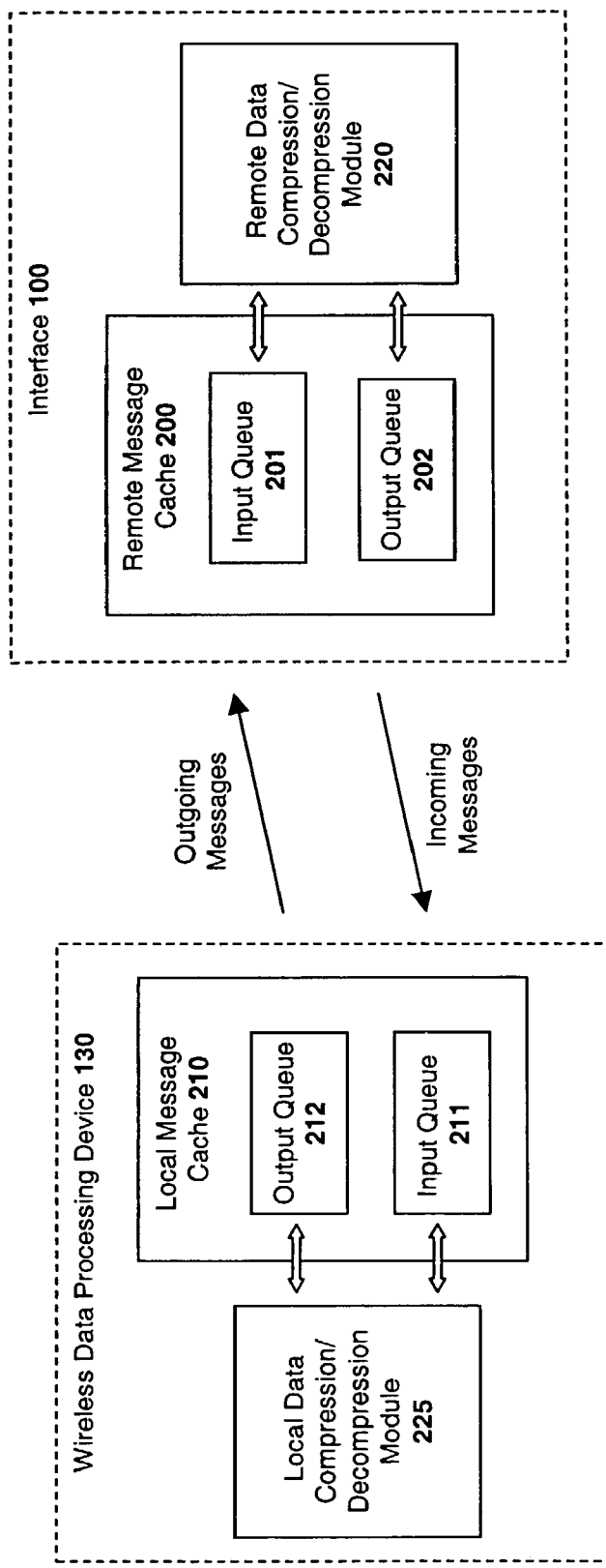
FIG. 2 illustrates one embodiment of a system for compressing data.

FIG. 2 illustrates certain aspects of the wireless data processing device 130 and the interface 100 in greater detail. In one embodiment, the data processing device 130 is comprised of a local data compression/decompression module 225 (hereinafter "codec module 225") and a local message cache 210. The local codec module 225 compresses outgoing data and decompresses incoming data using the various compression techniques described herein.

The local message cache 210 is comprised of an input queue 211 for temporarily storing a incoming messags and an output queue 212 for storing outgoing messages. Although illustrated as separate logical units in FIG. 2, the local message cache 210 may be comprised of only a single block of memory for storing both incoming and outgoing messages according to a cache replacement policy. In one embodiment, messages are maintained in the input queue and/or output queue using a first-in, first-out ("FIFO") replacement policy. However, various other cache replacement techniques may be employed while still complying with the underlying principles of the invention. For example, a least-recently used ("LRU") policy may be implemented where messages used least frequently by the local codec module 225 are stored in the cache for a shorter period of time than those used more frequently. As described below, messages used more frequently by the local codec module 225 may frequently include messages which form part of a common e-mail thread, whereas those used less frequently may include junk mail or "spam" (i.e., for which there is only a single, one way message transmission).

The interface 100 of one embodiment is comprised of a remote data compression/decompression module 220 (hereinafter "codec module 220") and a remote message cache 200 with a remote input queue 201 and a remote output queue 202. The codec module 220 compresses messages transmitted to the wireless data processing device 130 and decompresses messages received from the data processing device 130 according to the techniques described herein. The remote message cache 200 temporarily stores messages transmitted to/from the data processing device 130 (e.g., using various cache replacement algorithms as described above). In one embodiment, the cache replacement policy implemented on the interface 100 is the same as the policy implemented on the wireless device 130 (i.e., so that cache content is synchronized between the remote cache 200 and the local cache 210).

Figure 3B:

FIGS. 3*a-c* illustrate an exemplary sequence of e-mail messages which will be used to describe various aspects of the invention. FIG. 3*a* illustrates the initial e-mail message 300 in the sequence which (like most e-mail messages) is logically separated into a header information portion 305 and a text information portion 310. Also shown in FIG. 3*a* is an attachment 320, indicating that a document is attached to the message and an electronic signature which may be automatically inserted in the message by the sender's (i.e., John Smith's) e-mail client.

FIG. 3*b* illustrates the second e-mail message 301 in the sequence transmitted by user Roger Collins in response to the initial e-mail message. As indicated by the new header information 335, this message is transmitted directly to the initial sender, John Smith, and to a user who was CC'ed on the initial e-mail message, Tom Webster. The message is also CC'ed to everyone else in the group to whom the initial message was transmitted. This "reply to all" feature, which is found in most e-mail clients, provides a simple mechanism for allowing a sequence of e-mail messages to be viewed by a common group of individuals.

As illustrated in FIG. 3*b*, the text 310 of the initial e-mail message 300 is substantially reproduced in the new e-mail message. This "reply with history" feature is also common to most e-mail clients, allowing a sequence of comments from the individuals in the common group to be tracked from one e-mail message to the next. Also illustrated are a plurality of characters 316 inserted by the responder's (Roger Collins') e-mail system at the beginning of each line of the original e-mail text. This feature, which is common in some (but not all) e-mail systems, allows users to differentiate between new text and old text.

Accordingly, even after the initial e-mail response in a sequence of e-mails, the e-mail history (i.e., the portions of text and attachments reproduced from prior messages) represents a significant portion of the overall message, resulting in the transmission of a significant amount of redundant information being transmitted over the wireless network, in both the text portion of the e-mail and the header portion of the e-mail.

FIG. 3*c* illustrates the final e-mail message 302 in the sequence in which the addressee of the second e-mail responds to the sender of the second e-mail and CC's all of the other members in the group. As illustrated, the only non-redundant information in the e-mail message 302 is a few lines of text 355. The e-mail addresses of all of the group members are the same as in the previous two messages (although switched between different fields, the underlying addresses are the same) and the text and header information from the previous messages 300, 301, including the attachment 320 are reproduced, with only a few minor modifications (e.g., the additional ">" characters inserted by the e-mail system).

One embodiment of the invention compresses e-mail messages by taking advantage of this high level of redundancy. In particular, rather than sending the actual content contained in new e-mail messages, portions of the new messages identified in previous e-mail messages stored in the caches 200, 201 are replaced by pointers to the redundant portions. For example, in message 302 all of the redundant content from message 301 may be replaced by a pointer which identifies the redundant content in message 301 stored in the cache of the user's wireless device. These and other compression techniques will be described in greater detail below.

Figure 4:
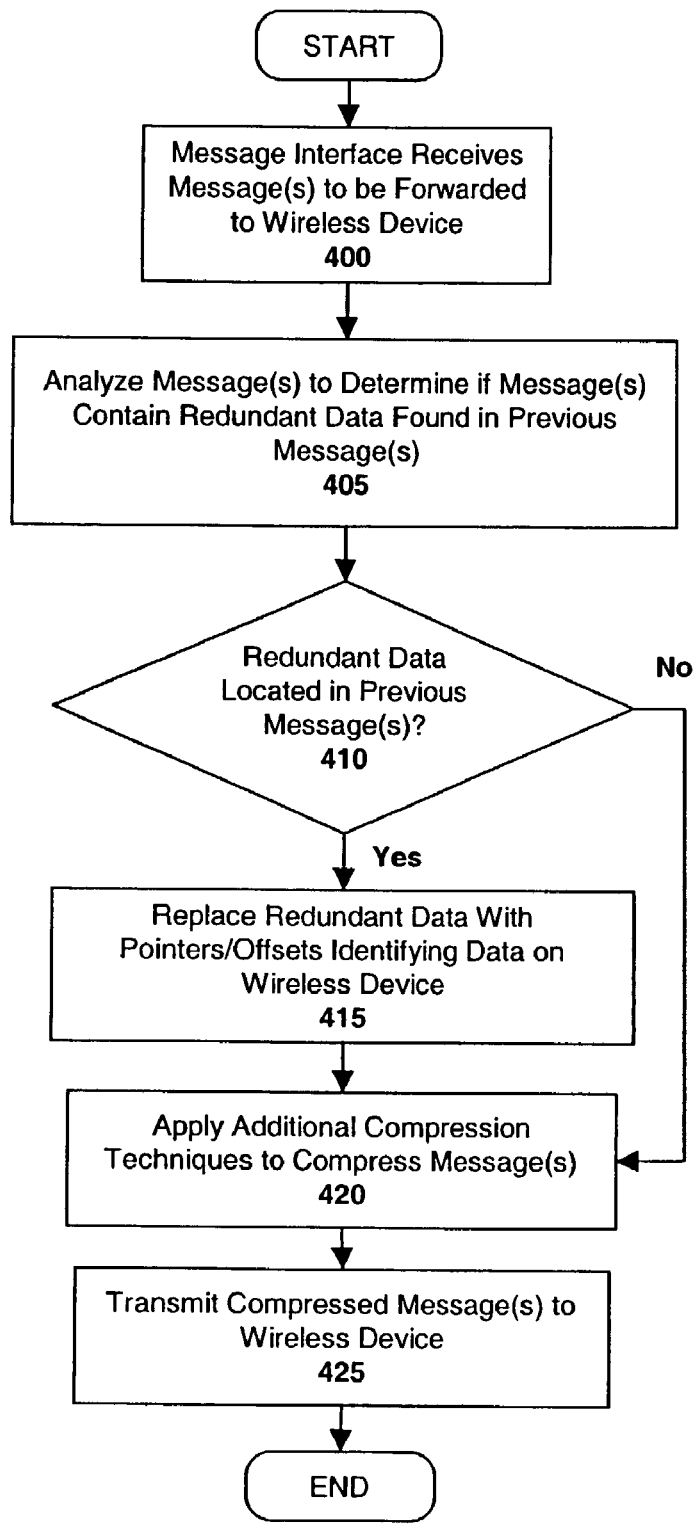
FIG. 4 illustrates one embodiment of a method for compressing data using redundant data found in previous messages.

FIG. 4 illustrates one embodiment of a method for compressing messages using redundant content found in previous messages. This embodiment will be described with respect to FIG. 5, which illustrates certain aspects of the message interface 100 in greater detail. At 400, the interface 100 receives a message (or a group of messages) to be transmitted to a particular wireless data processing device 130. At 405, the message is analyzed to determine whether it contains redundant data found in previous messages. In one embodiment, this is accomplished via message identification logic 500 shown in FIG. 5 which scans through previous e-mail messages to locate those messages containing the redundant data.

Various message identification parameters 505 may be used by the message identification logic 500 to search for messages. For example, in one embodiment, the message identification logic will initially attempt to determine whether the new message is the latest in a sequence of messages. Various techniques may be employed by the message identification logic 500 to make this determination. For example, in one embodiment, the message identification logic 500 will search the subject field of the message for the stings which indicate the new message is a response to a prior message. If these strings are identified, the message identification logic 500 may then look for the most recent message in the sequence (e.g., based on the text found in the subject field). For example, referring back to the FIGS. 3*a-c*, upon receiving message 302, the message identification logic 500 may identify the message 302 as part of a sequence based on the fact that it contains "RE: Patent Issues" in the subject field. The identification logic 500 may ignore the RE: (or FW: if the message is forwarded) and scan to the text in another message which matches the remainder of the subject field (i.e., "Patent Issues") and identify the most recent previous message containing that text in it's subject header.

If the message subject does not contain characters such as RE: or FW: indicating that the message is part of a sequence, then message identification logic 500 may employ a different set of identification parameters 505 for identifying previous messages. For example, in one embodiment, the message identification logic 500 will search for the most recent message in which the sender of the new message is listed in the header (e.g., as the recipient). Moreover, the message identification logic 500 may search for certain keywords or combinations of words indicating that the message contains relevant data (e.g., such as the electronic signature 315 illustrated in FIGS. 3a-c). In one embodiment, the message identification logic 500 may generate a prioritized subset of messages which (based on the defined parameters 505) are the candidates most likely to contain content found in the new message.

Figure 5:
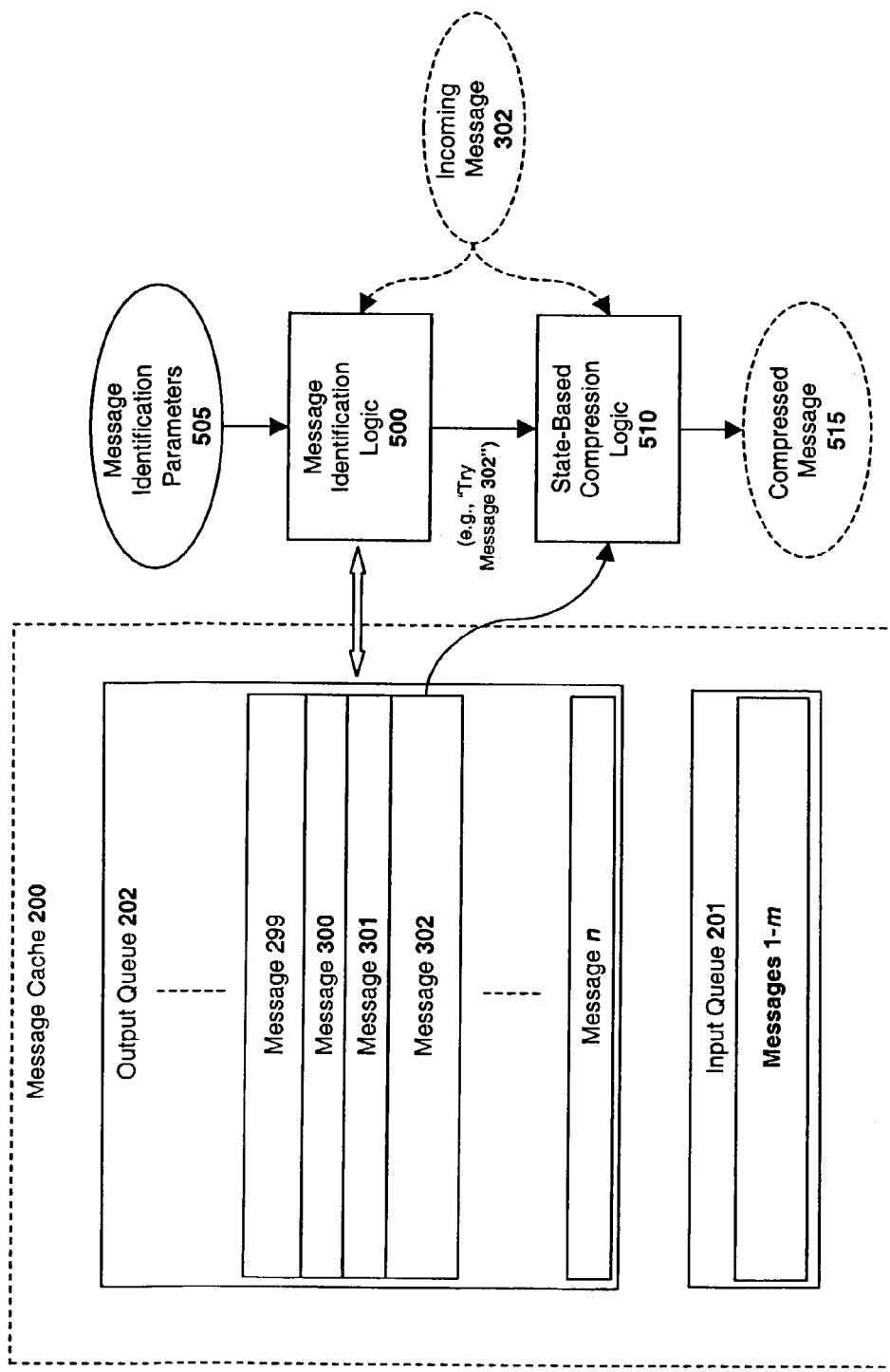
FIG. 5 illustrates one embodiment of an apparatus for performing state-based compression.

If no redundant data exists in prior messages, determined at 410, then at 420 additional compression techniques are applied to compress the message, some of which are described below. If, however, redundant data exists in prior messages then, at 415, the redundant data is replaced with pointers/offsets identifying the redundant data on the cache 210 of the wireless device 130 (or in the cache 200 of the interface 100, depending on the direction of message transmission). As illustrated in FIG. 5, in one embodiment, this is accomplished by state based compression logic 510 which generates the pointers/offsets using the messages identified by the message identification logic 500.

Figure 6:
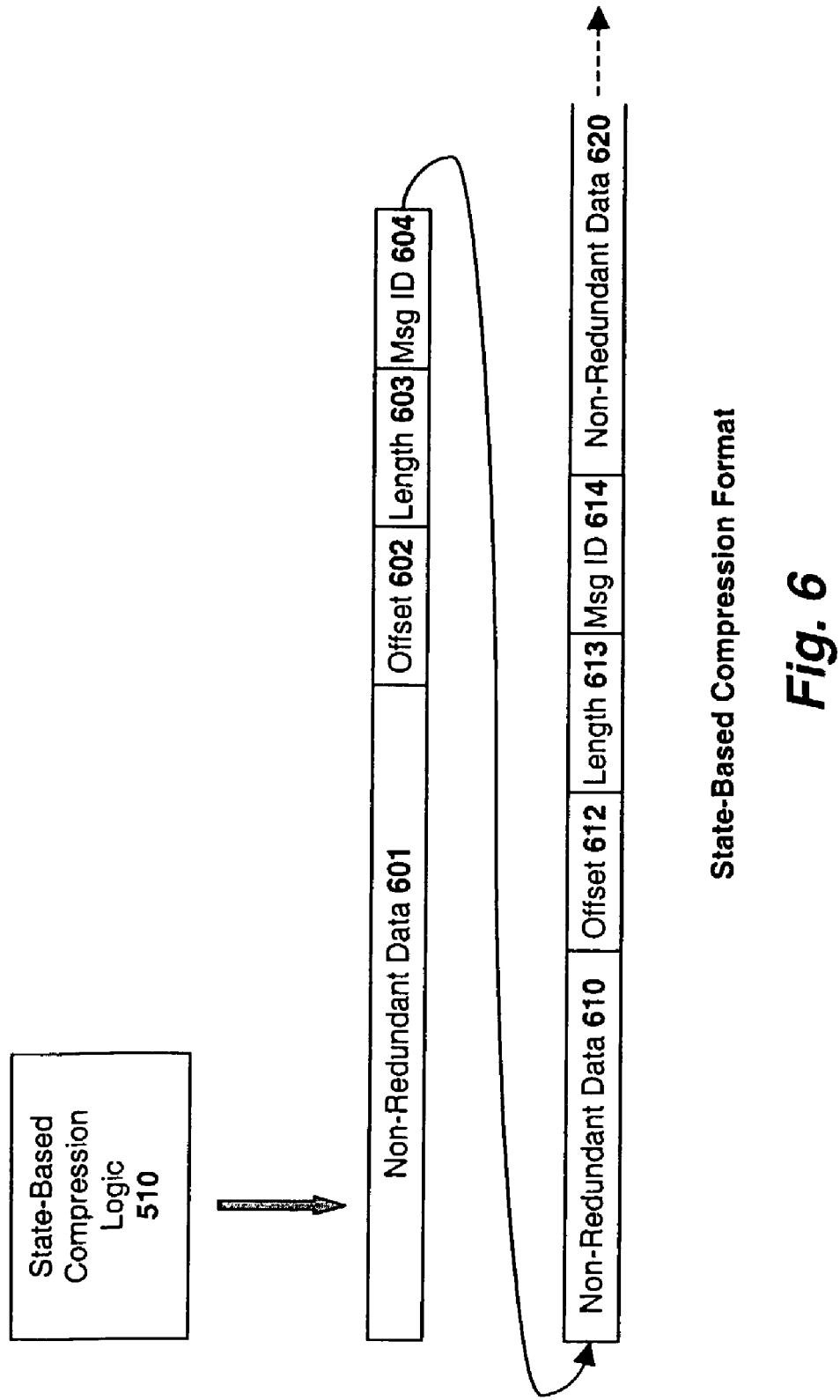
FIG. 6 illustrates one embodiment of a state-based data compression format.

FIG. 6 illustrates one embodiment of a state-based compression format generated by the state-based compression logic 510. As illustrated, the format is comprised of a one or more chunks of non-redundant data 601, 610, 620 separated by offsets 602, 612, lengths 603, 613, and message identification data 604, 614, which identify blocks of data from previous messages. For example, if the compression format of FIG. 6 were used to encode message 302 shown in FIG. 3c, the new text 302 might be stored as non-redundant data 601, whereas all of message 301 might be identified by a particular message ID 604, followed by an offset 602 identifying where to begin copying content from message 301 and a length 603 indicating how much content to read from the address point identified by the offset.

Similarly, if message 301 from FIG. 3b were encoded by the state-based compression logic 510, the new text portion 340 might be stored as non-redundant data 601. Moreover, each of the ">" characters automatically inserted by the e-mail system 316 might be transmitted as non-redundant data, separated by lines of redundant data identified by offsets and lengths (i.e., at the end of each redundant line in message 300 identified by lengths/offsets in the new message, a new, non-redundant ">" would be inserted).

In one embodiment, when a user has not received messages for a long period of time, numerous related messages (e.g., such as messages 300-302) may build up in his inbox on the e-mail service 102. Accordingly, in one embodiment, the interface 100 will employ state-based compression techniques as described above using pointers to messages which have not yet arrived in the cache of the user's wireless device. That is, the interface 100 will determine where messages in the group (stored in the user's inbox on the service 102) will be stored in the cache 210 of the wireless data processing device 130 once the user re-connects to the service.

Referring once again to FIGS. 4 and 5, once the state-based compression logic 510 finishes compressing the message, the compressed message 515 may be transmitted to the user's wireless device 130. Alternatively, at 420, additional compression techniques (described below) may be applied to compress the message further. Once the message is fully compressed it is transmitted to the wireless device (at 425) where it may be decompressed via codec module 225.

The state-based compression techniques were described above in the context of an interface 100 compressing messages before transmitting the messages to a wireless device 130. It will be appreciated, however, that the same compression techniques may be performed by the wireless device 130 before it transmits a message to the interface 100 (e.g., lengths/offsets may identify redundant data stored in the remote message cache 200). In addition, although described above with respect to e-mail messages, the described compression techniques may be employed to compression various other message types (e.g., newsgroup articles, instant messages, HTML documents . . . etc).

Supplemental/Alternative Compression Techniques

Various additional compression techniques may be employed, either in addition to or as an alternative to the state-based compression techniques just described.

In one embodiment of the invention, common characters and strings of characters (i.e., which are frequently transmitted between the wireless device 130 and the interface 100) are encoded using relatively small code words whereas infrequent characters or strings of characters are encoded using relatively larger code words. In order to encode data in this manner, a statistical analysis is performed to identify common character strings. Based on the statistical analysis, a lookup table similar to the one illustrated in FIG. 7 is generated and maintained at both the wireless device 130 and the interface 100. As illustrated, certain character strings such as the domain used for corporate e-mail "@good.com" and the first 6 digits of the corporate telephone number, e.g., "(408) 720-" may be quite common. As such, replacing these common bit strings with relatively small code words may result in a significant amount of compression. Referring back to messages 300-302, using this compression technique, the domain "@good.com" encountered numerous times in each message header could be replaced by a short, several-bit code word.

In one embodiment, a different look up table may be generated for different types of data transmitted between the interface 100 and the wireless data processing device 130, resulting in greater precision when identifying common strings of characters. For example, a different set of code words may be used to compress e-mail messages than that used to compress the corporate address book. Accordingly, the code word table used to compress e-mail messages would likely contain relatively small code words for the most common e-mail domains whereas the corporate address book might also contain relatively small code words for the corporate address and portions of the corporate phone number.

Moreover, in one embodiment, a unique code word table may be generated for each field within a particular type of data. For example, a different code word table may be employed for the e-mail header field than that used for the remainder of the e-mail message. Similarly, a different table may be generated for the "address" field of the corporate address book than that used for the "e-mail address" field, resulting in even greater precision when generating the set of code words.

Rather than statistically generating and transmitting a code word table for each field, alternatively, or in addition, one embodiment of the invention refers to a dictionary of "known" words, like an English dictionary, and therefore does not need to transmit the dictionary with the data. For example, in one embodiment, a spell-check dictionary maintained on the wireless device 130 and/or the interface 100 may be used to compress content. Rather than sending the actual text of the e-mail message, each word in the message would be identified by its entry in the spell-check dictionary (e.g., the word "meeting" might be replaced by entry#3944).

One type of data particularly suitable to the foregoing types of compression is the corporate address book maintained on most corporate e-mail servers. In one embodiment of the invention, the corporate address book is synchronized initially through a direct link to the client 110 (see FIG. 1). On the initial synchronization (e.g., when the wireless device is directly linked to the client 110), statistics on common letters and "tokens" (e.g., names, area codes, e-mail domains) are generated. The statistics and tokens are then used to compress the data as described above. Thereafter, any changes to the address book are wirelessly transmitted. On subsequent updates, the compressors on both sides (wireless device 130 and interface 100) would refer to the earlier statistics gathered, and thus compress without any new statistics or words being transmitted.

The updates may represent a small percentage of the entire address book, but may still represent a significant number of bytes, especially when multiplied by all the wireless devices in use in use at a given company. Accordingly, reducing the amount of data required to transmit the updates to the address book as described above, would result in a significant savings in transmission costs. Additionally, as the address book can be very large relative to the storage available on the client, storing the address book on the client in a compressed form will allow more entries to be stored.

In one embodiment, to conserve additional space, only certain fields of the corporate address book will be synchronized wirelessly. For example, only the Name, Address, E-mail, and Phone Number fields may be updated wirelessly. All fields of the address book may then be updated when the wireless device is once again directly linked to the client 110.

Figure 8:
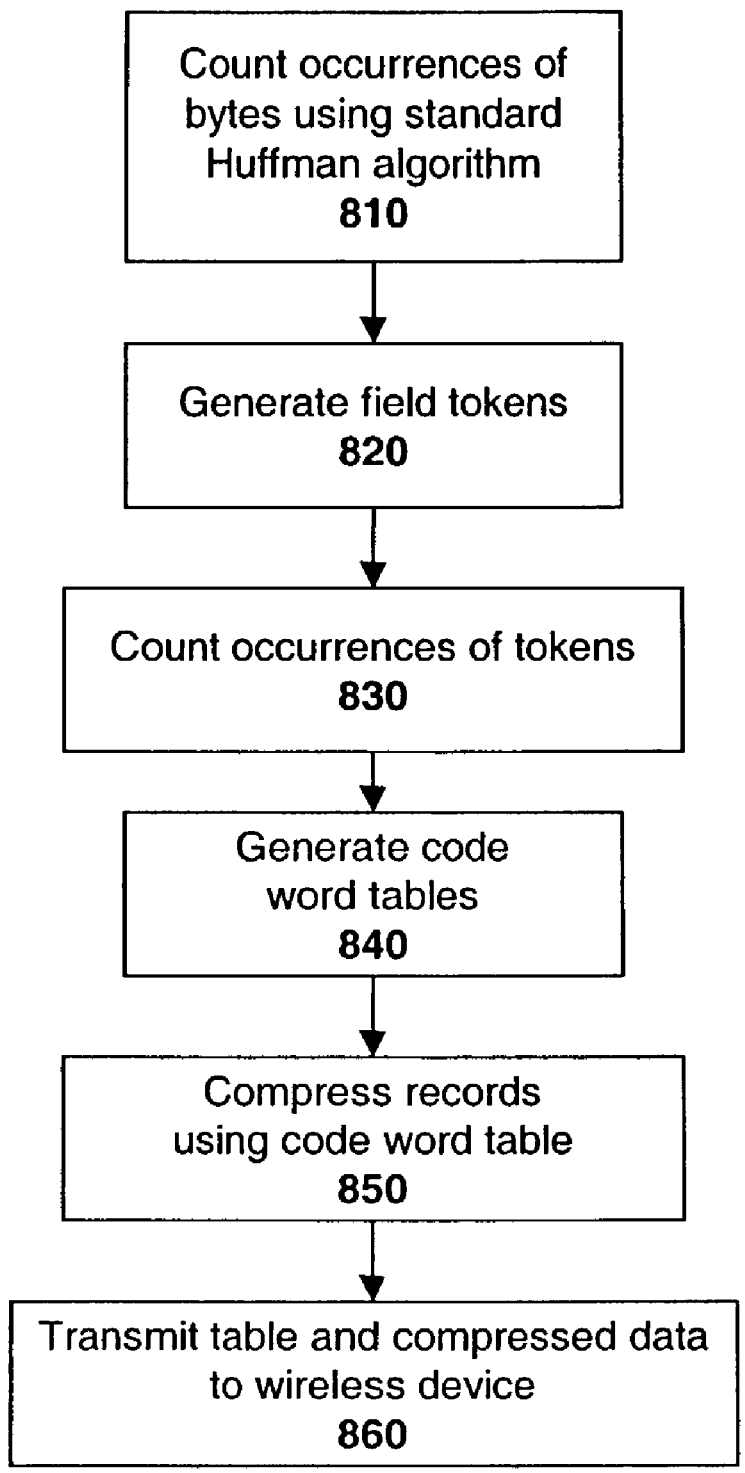
FIG. 8 illustrates one embodiment of a method for compressing data with code words.

One embodiment of a method for generating a code word table is illustrated in FIG. 8. At 810, occurrences of certain byte strings are calculated for use by a standard Huffman compression algorithm. At 820 certain "tokens" are generated for a particular field based on the natural boundaries for that field type. For example, as described above, e-mail addresses could be broken into ".com" and "@good.com" as described above for e-mail fields. Phone numbers might be broken into "(650)" and "(650) 620-" for address book fields.

At 830 the occurrences of tokens are counted in the same way as the occurrences of the byte strings are counted, though one occurrence of, say, a four-byte token adds four to the count. At 840 a code word table of all the letters and those tokens that occur more than once (or maybe the top N tokens that occur more than once) is generated. Part of the table will include the tokens themselves. At 850, each record is compressed using the code word table of characters and tokens and, at 860, the code word tables and the compressed records are then sent to the wireless device 130.

In one embodiment, the code word tables are identified with a unique number, such as a timestamp. Both the interface 100 and the wireless device 130 would store the tables. On the wireless device 130, the records may remain compressed to conserve space, being decompressed only when opened. On subsequent syncs, the wireless device 130 may request updates to the corporate dictionary. As part of the request, the wireless device 130 may include the unique number assigned to the code word tables. If, for some reason, the wireless device 130 doesn't have the original tables, it may send a particular type of ID to notify the interface 100 (e.g., by using a "0" for the ID). Likewise, if the host doesn't recognize the ID for some reason, it can ignore the original tables and create new ones.

In most cases, however, the wireless device 130 and interface 100 will agree on what the ID is, and the compression of the update will use the existing code word tables previously computed. For example, a new employee with the same e-mail domain and phone prefix as existing employees would compress nicely. Since the updates should be a small percentage of the overall address book, it will most likely be very similar to the existing data.

One embodiment of the invention converts alphanumeric characters (e.g., standard ASCII text) into a proprietary variable-bit character format, allocating relatively fewer bits for common characters and relatively more bits for uncommon characters. In one particular embodiment, 6 bits are allocated for most characters, and 12 bits are allocated for all other characters. This embodiment may be seamlessly integrated with the other forms of compression described above (e.g., message pointer generation, code word lookups, . . . etc) through an escape function described below.

Most messages will have ASCII text in them. For example, the TO: field in an e-mail, or the name in an Address Book entry are generally comprised of ASCII text. Most ASCII text use 7 bits/character. Typical exceptions are accented characters, like ñ or ö. Realistically, though, most text in a text field consists of a-z, 0-9, space, and a few symbols.

Compressing text using code word tables as described above is a good way to encode large amounts of text, because it gathers statistics about how frequently a given character occurs, and represents more frequent characters in fewer bits. For example, the letter 'e' occurs more often than the letter 'k', so it may be represented in, say, 3 bits. It is also particularly suitable for compressing data in specific data fields where it is known that the same character strings appear regularly (e.g., such as the e-mail domain "@good.com"). One problem with this technique, however, is that it requires transmitting and storing the statistical information with the encoded text. For small amounts of text (e.g., short e-mail messages), this becomes impractical.

A 6-bit character format provides for 64 characters ($2^6$=64). In one embodiment, the following symbols are encoded using 6-bits: a zero, handy for denoting the end of strings; 'a' through 'z;' '0' through '9;' space; and the most common symbols (e.g., dot, comma, tabs, new-lines, @, parens, !, colon, semicolon, single, double quotes, . . . etc). The values above account for 48 of the 64 values, leaving 16 values remaining.

In one embodiment, the remaining 16 values are used for the following escape values:

(1) Four values for combining with the next 6-bits to allow any possible ASCII value to be encoded in two 6-bit values. It allows for any upper case letter, symbols not in the top ten, accented characters, and so on. For example, binary values of 60, 61, 62, and 63 may each identify another 6-bit value which contains the underlying character information. This provides for the coding of an additional 256 characters (4*64=256), more than enough to encode the entire US-ASCII character set.

(2) Shift Lock. Turns on shifting until a subsequent Shift Lock turns off shifting. For letters, this is like a caps lock. For numbers and symbols, this may have no effect. Alternatively, a second set of values may be defined when shift lock is on (e.g., a second "top ten" list of symbols).

In one embodiment, the remaining 11 6-bit characters are "installable escape values," allowing one or more standard or custom compressors. For example, the TO:, FROM:, CC:, and BCC: fields in an e-mail all contain a list of e-mail addresses, separated by a semicolon. As such, the following special escape values may be defined: (1) the customer's/user's e-mail address may be converted into a 6-bit value; (2) the customer's/user's domain may be converted into a 6-bit value (e.g., "@Good.Com" would become 6 bits); (3) "common" domain names and suffixes may be converted into a 6-bit value and a 6-bit argument (e.g., the "common" list may be 64 of the most common names, and might include "@aol.com", "@webtv.com", ".com", ".net", ".org", ".gov", ".us", ".uk", . . . etc); and (4) names "used recently" in an e-mail may be converted into a 6-bit value and a 6-bit argument. Elsewhere in the message is the e-mail ID this is dependent on. The argument might include 2 bits identifying the field (TO:, FROM:, CC:, or BCC:), and 4 bits identifying the first 16 e-mail addresses in that field.

Figure 9:
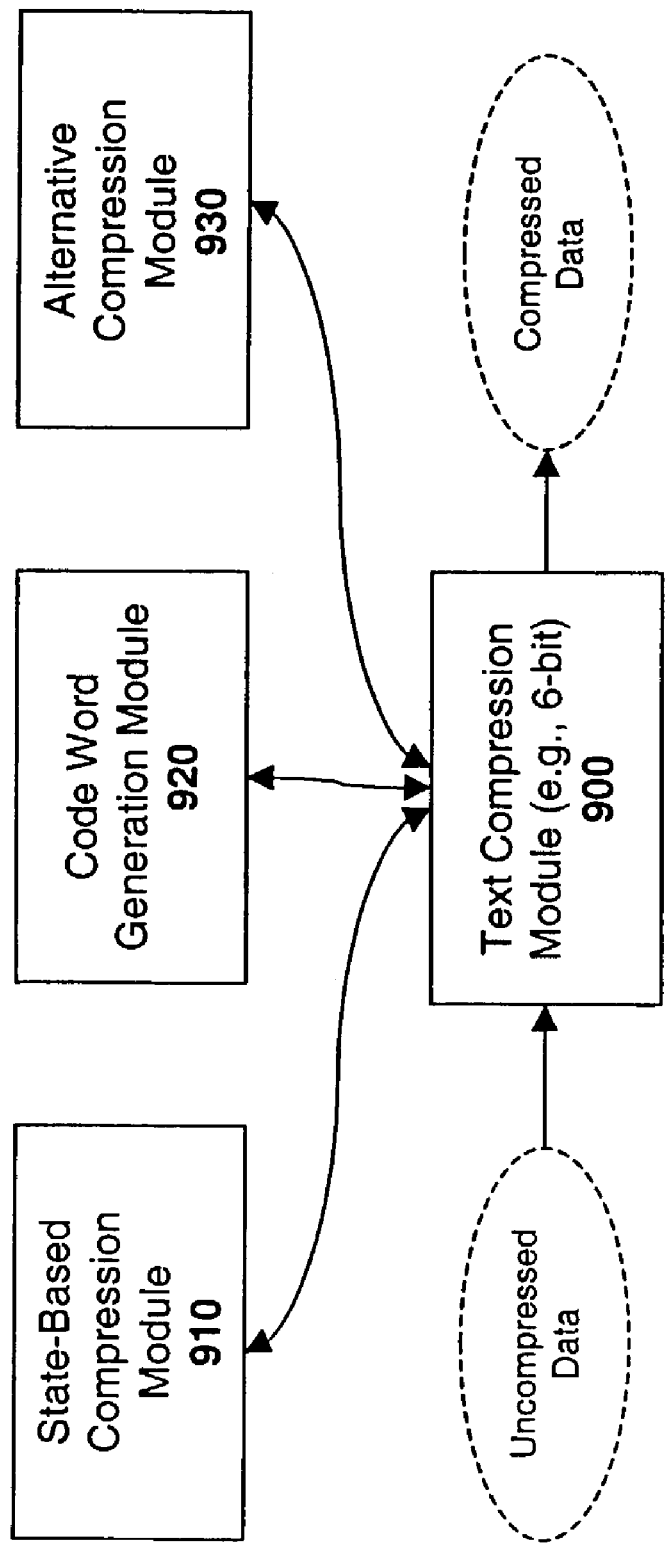
FIG. 9 illustrates a text compression module coordinating data compression tasks between a plurality of other compression modules.

The new character format may be employed seamlessly with the other types of compression described above (e.g., code words, repeated characters; LZ compression; dictionary lookups; and/or referring to prior messages). In one embodiment, illustrated in FIG. 9, a text compression module 900 compresses text according to the 6-bit character format described above and coordinates compression functions between various other compression modules. In the illustrated embodiment, this includes a state-based compression module 910 for compressing messages by referring to prior, cached messages (as described above) and a code word compression module 920 which compresses common character strings using code words (e.g., by encoding statistically-analyzed tokens, referring to a spell-check dictionary, . . . etc, as described above). In addition, as indicated by alternative compression module 930, various other types of compression may be employed on the system to attain an even greater level of compression (e.g., standard LZ compression).

Figure 10:
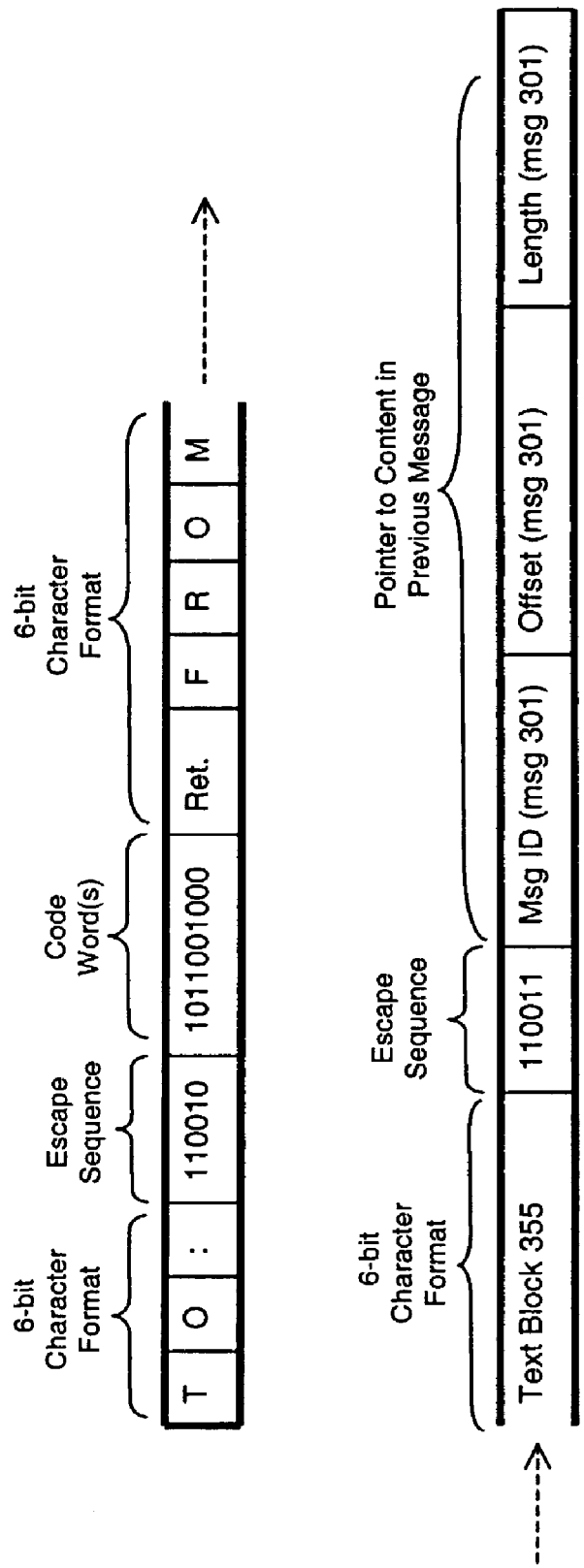
FIG. 10 illustrates a compressed data format according to one embodiment of the invention.

FIG. 10 illustrates an exemplary portion of e-mail message 302 (from FIG. 3c) encoded according to this embodiment of the invention. Starting from the upper right corner of the e-mail message 302, the text compression module 900 begins encoding the first set of characters (i.e., starting with the addressee field "TO:"). With each character it coordinates with the other compression modules 910, 920, 930 to determine whether those modules can achieve greater compression. If not, then the text compression module 900 encodes the text according to the 6-bit character format. If a higher level of compression can be achieved with one of the other compression modules 910, 920, 930, however, the text compression module 900 hands off the compression task to that module and inserts an "escape" sequence of bits indicating where the compression task was accomplished by that module.

For example, as illustrated in FIG. 10, the escape sequence "110010" following the first three characters ("TO:") indicates that the code word generation module 920 compresses the subsequent portion of data. In operation, once this point in the e-mail message is reached, the code word generation module 920 notifies the text compression module 900 that it can achieve a higher level of compression using code words (e.g., using a tokenized e-mail address). Accordingly, the sequence "1011001000" following the escape sequence "110010" is a code word representing the tokenized e-mail address "Collins, Roger"<rcollins@good.com>. Alternatively, two or more code words may be used to encode the e-mail address, depending on the particular set of code words employed by the system (e.g., one for the individual's name and a separate one for the domain "@good.com"). As indicated in FIG. 10, the text compression module 900 may then pick up the encoding process following the tokenized e-mail address (i.e., the return character followed by the text "FROM:").

After the e-mail header information is encoded, the block of new text 355 is encoded using the 6-bit character format. Of course, depending on the code words employed by the code word generation module 920 and/or previous e-mails on the system, portions of the block of new text 355 may also be encoded using code words and/or pointers to previous messages. Following the text block 355, the state-based compression module 910, after analyzing the message, notifies the text compression module 900 that it can achieve a higher level of compression by identifying content found in a previous message. As such, an escape sequence "110011" is generated indicating that compression is being handled by the state-based compression module 910 from that point onward. The state-based compression logic 910 then identifies a previous e-mail message using a message ID code (indicating message 301), and generating an offset and a length indicating specific content within that e-mail message (e.g., employing one or more of the state-based compression techniques described above).

It should be noted that the specific example shown in FIG. 10 is for the purpose of illustration only. Depending on the code words employed by the system and/or the previous messages stored on the system, the actual encoding of the e-mail message 302 may turn out to be different than that illustrated. For example, as mentioned above, the block of text 355 may be encoded using code words and/or pointers to previous messages as well as the 6-bit character format.

Various supplemental/alternative compression techniques may also be employed (e.g., represented by alternate compression module 930). In one embodiment, certain types of data are not transmitted wirelessly between the wireless data processing device 130 and the interface 100. For example, in one embodiment, when a device has been unable to receive messages for a certain period of time (e.g., one week), only message headers are initially transmitted to the device 130, thereby avoiding an unreasonably long download period (i.e., wherein all messages received over the period of unavailability are transmitted to the device). Alternatively, or in addition, in one embodiment, when the device is out of touch for an extended period of time, only relatively new messages (e.g., received over a 24-hour period) are transmitted to the device when it comes back online. Similarly, in one embodiment, only e-mail header information is transmitted to the wireless device 130 (e.g., indicating the subject and the sender) when the user is a CC addressee and/or when the e-mail is from a folder other than the user's inbox.

In one embodiment, only certain fields are updated on the device 130. For example, with respect to a corporate or personal address book, only Name, E-mail Address and Phone Number fields may be synchronized on the device 130. When the device is connected directly to the client, all of the fields may then be updated.

In one embodiment, certain details are stripped from e-mail messages to make them more compact before transmitting them to the device 130. For example, only certain specified header information maybe transmitted (e.g., To, From, CC, Date, Subject, body, . . . etc). Similarly, the subject line may be truncated above a certain size (e.g., after 20 characters). Moreover, attachments and various formatting objects (e.g., embedded pictures) may not be transmitted. In one embodiment, when a user lists him/herself as a CC addressee on an outgoing message, this message will not be retransmitted back to the wireless device 130.

Although attachments may not be transmitted to the wireless device 130, in one embodiment, users may still forward the attachments to others from the wireless device (the attachments will, of course, be stored on the e-mail server). Moreover, in one embodiment, attachments may be sent to a fax machine in response to a user command from the wireless device 130. Accordingly, if a user is away from the office and needs to review a particular attachment, he can type in the number of a nearby fax machine and transmit this information to the interface 100. The interface 100 will then open the attachment using a viewer for the attachment file type (e.g., Word, Power Point, . . . etc) and transmit the document via a fax modem using the fax number entered by the user. Thus, the user may view the attachment without ever receiving it at the device.

Batch Processing of Message Transactions

Figure 11:
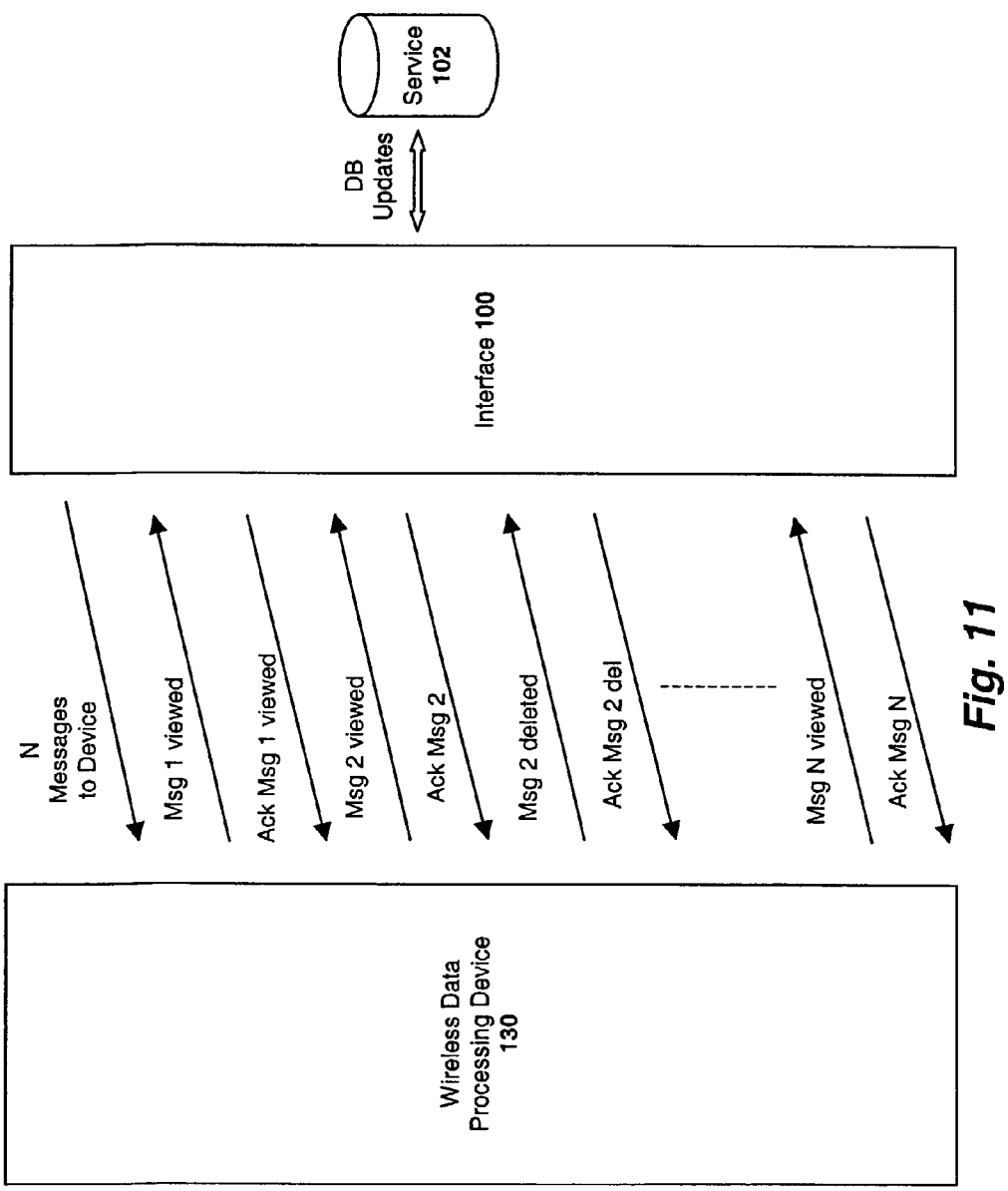
FIG. 11 illustrates one embodiment of a system for synchronizing message transactions between a wireless device and a service.

As illustrated in FIG. 11, under certain conditions, maintaining complete synchronization between the device 130 and service 102 may consume a significant amount of wireless bandwidth. For example, if a user has been out of range for an extended period or time (e.g., the device is turned off) a plurality of messages may be transmitted in succession from the interface 100 to the wireless device 130 when the device is back within range. In some cases, of course, the user may not necessarily be out of range at all. Rather, the user may simply receive/transmit a significant number of e-mail messages is succession.

As illustrated, once the user begins viewing messages on the device 130, message transaction updates are continually sent to the interface 100. For example, when the user reads message 1, an indication that the message was read is transmitted to the interface 100. This may be followed by an acknowledgement from the interface 100 (e.g., indicating that the communication was received). Similarly, when the user reads and then deletes message 2, separate indications that the message was read and then deleted are transmitted to the interface 100, respectively, followed by an acknowledgement for each transaction.

Because each individual data transmission between the device 130 and the interface 100 may include a significant amount of overhead (e.g., header information such as the device address 130, the service address 102 and various other types of header/control information), and because each message may require an acknowledgement from the interface 100, synchronizing messages in this manner may consume a significant amount of bandwidth. Put another way, the ratio of actual data (e.g., database updates) to control data (e.g., header data) will be relatively low. Moreover, continual data transmissions of this type will tend to consume significantly more power (e.g., because the device's radio will not be idle long enough to enter its low-power mode).

Figure 12:
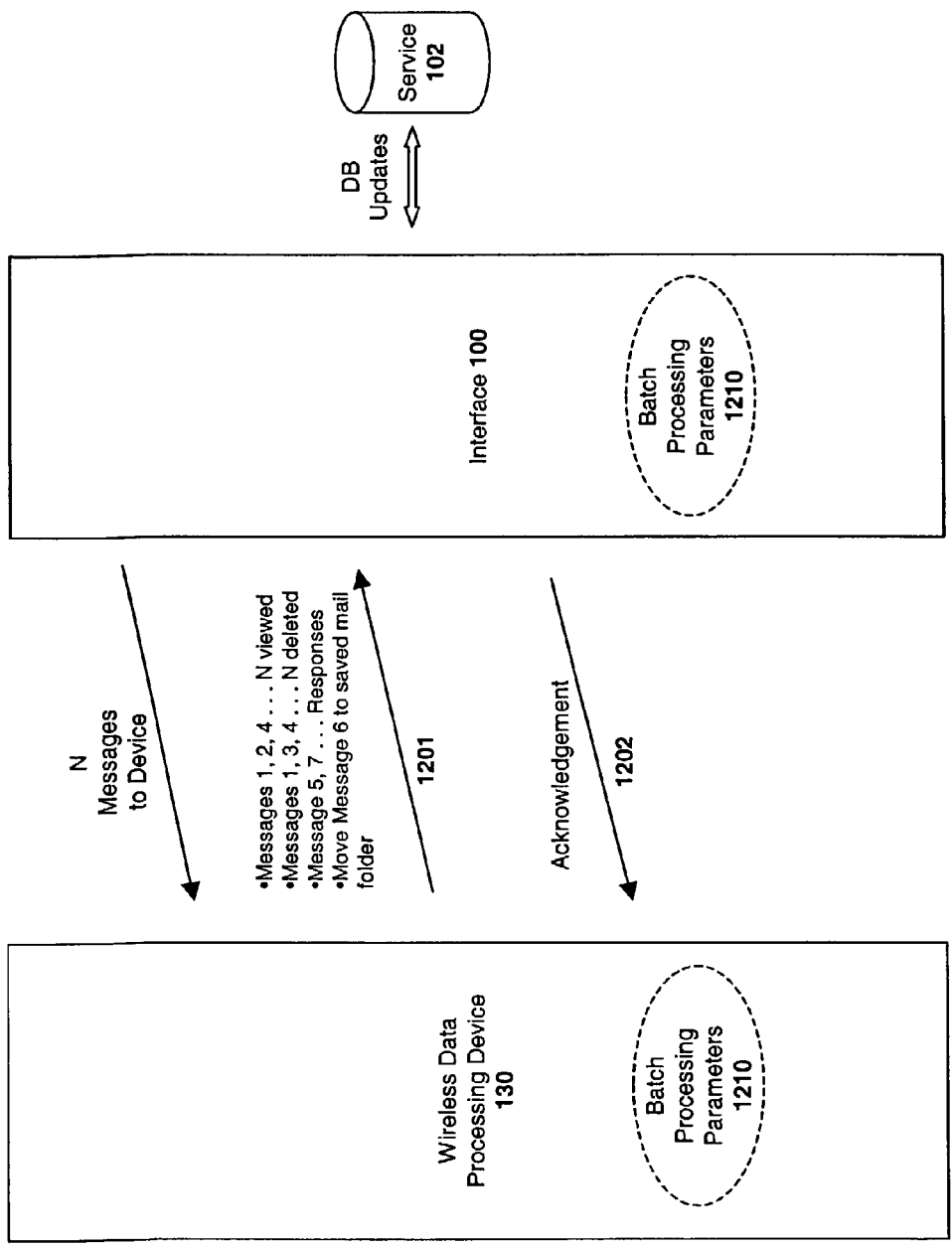
FIG. 12 illustrates an improved embodiment of a system for synchronizing message transactions between a wireless device and a service.

Accordingly, in one embodiment of the invention, under certain conditions (described below), data transactions between the device 130 and the interface 100 are combined, or batch-processed to conserve bandwidth. For example, as illustrated in FIG. 12, in this embodiment, a plurality of message transactions are performed on the data processing device before the device is synchronized with the service 102. Subsequently, a single transmission 1201 containing all of the synchronization updates (e.g., message viewings and deletions, message responses, . . . etc) is transmitted to the interface 100, followed by a single acknowledgement 1202 that the update was received.

Similarly, under certain conditions, database modifications at the service 102 may be batch-processed before being transmitted to the device 130. For example, if the user is in the office reading through and responding to a series of e-mail messages (e.g., from the client 110), transmitting each message transaction to the wireless device 130 independently of one another may not be efficient for the reasons set forth above. As such, in one embodiment, these transactions (or a subset thereof) are combined and concurrently transmitted to the wireless device 130.

As indicated in FIG. 12, the specific conditions under which batch-processing is initiated and (once initiated) the specific manner in which the messages are combined may be based on processing parameters 1210, 1220 configured in the wireless device 130 and/or the interface 100, respectively. For example, in one embodiment, batch processing will be triggered if the user has not checked messages for an extended period of time (e.g., two days). In this case, it is expected that once the user begins to check messages he/she will perform a significant number of message transactions within a relatively short period of time. It should be noted, however, that various different batch-processing triggers may be employed while still complying with the underlying principles of the invention (e.g., two or more successive message transactions within a predetermined period of time, manual triggering set by the end user, . . . etc).

Once batch-processing is triggered, message transactions occurring over periodic intervals (e.g., every 10 minutes) may be combined and transmitted at the end of each interval. Alternatively, or in addition, once the combined message transactions reach some predetermined threshold (e.g., based on the sheer number of transactions and/or the amount of data contained within the combined transactions), the combined messages may be transmitted together. Various other message combination parameters may be employed while still complying with the underlying principles of the invention.

Figure 13:
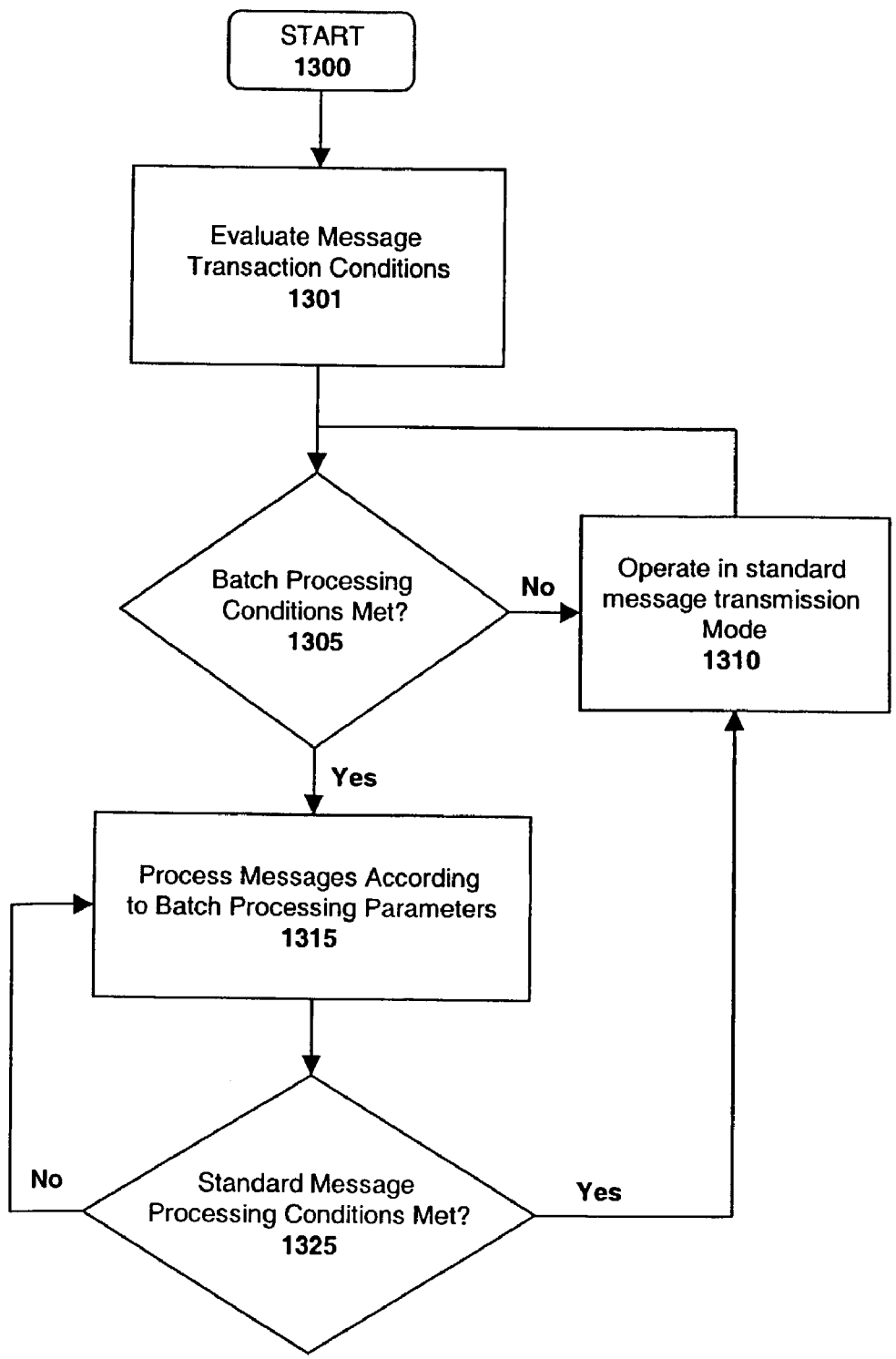
FIG. 13 illustrates a method for determining whether to enter a batch processing mode.

One embodiment of a method for performing batch processing of message transactions is illustrated in FIG. 13. At 1301, current message transaction conditions are evaluated (e.g., the frequency with which message transactions are performed, when the last message transaction was initiated, . . . etc). At 1305 it is determined whether the current conditions match the threshold conditions required for batch processing. For example, as described above, if the user's wireless data processing device 130 has been out of range for a predetermined period of time and/or if the user has not checked his e-mail for a period of time, the batch processing mode may be invoked.

If the conditions are not met, then at 1310, the system remains in standard message transaction mode. If, however, the conditions have been met, then at 1315, the system (i.e., the wireless device 130 and/or interface 100) processes messages according to the established batch-processing parameters. For example, at this stage the device 130 and/or interface 100 may combine message transactions which occur over a predetermined period of time (or which result in a specified number of transactions or amount of data as described above).

At 1325 it is determined whether the standard message processing conditions have once again been met. For example, if the user's data processing device has been in range for a predetermined period of time after entering the batch-processing mode, and the user is periodically receiving and quickly responding to messages, this may cause the system to revert back to the standard message transmission mode. Depending on the system configuration, various additional/alternative conditions may cause the system to enter its standard message processing mode.

Multi-Level Batch Processing

In one embodiment of the invention, two levels of batch processing are employed: one at the customer site 120 and another at a data center located on the external data network 170. This embodiment will be described with respect to FIG. 14 which shows a data center 1410 communicatively coupled to the customer site via an outbound gateway 1413 and to the wireless network 171 via a wireless gateway 1411.

Batch processing logic 1400 at the customer site provides the first level of batch processing. Specifically, in one embodiment, when a user concurrently performs a group of message transactions, the batch processing logic 1400 logically combines the message transactions before transmitting them to the data center 1410. For example, when a user deletes a block of e-mail messages or moves a block of messages from one folder to another, the block of individual deletions/moves are transmitted as a group (i.e., as opposed to transmitting a series of individual deletes/moves and waiting for an equal number of individual acknowledgements form the data center 1410). In addition, the block of message transactions are temporarily stored off in the remote message cache 200 (described above with respect to FIG. 2), or in an alternate cache at the customer site.

At the data center 1410, the batch-processed message transactions are initially stored off in a secondary cache, referred to herein as a "message switch" 1412. After receiving and storing the block of message transactions, the message switch sends a block acknowledgement to the batch processing logic 1400, which may thereafter delete the block of message transactions from the remote message cache 200. Alternatively, the batch processing logic 1400 may continue to store the block of message transactions for some predetermined amount of time or after some predetermined event has occurred (e.g., until it receives an indication that the message transactions have been successfully received by the wireless device 130).

If the wireless device is actively connected to the wireless network, the message transactions are forwarded from the message switch 1412 to the wireless device as a group (via the wireless gateway 1411). For example, an indication that 10 messages have been moved from the user's "inbox" to the user's "saved mail" folder may be transmitted together. The wireless device 130 may then respond with a single acknowledgement that it received all 10 message transactions. Alternatively, if one of the message transactions had not been successfully received, the wireless device 130 may request that individual message transaction as opposed to the entire group (as described in detail below in the section entitled "In-Order Delivery of Message Transactions").

In one embodiment, the message switch 1412 performs a second level of batch processing functions in addition to (or in lieu of) the first level of batch processing performed by the batch processing logic 1400 at the customer site. Specifically, the message switch 1412 batch-processes sequences of message transactions generated over a period of time as opposed to the bulk message transactions (e.g., "delete 10 messages") just described. For example, a user will typically read one new e-mail message after another at the customer site, and may continually add new to-do list entries and calendar entries throughout the day. In one embodiment, these individual message transactions are transmitted from the interface 100 to the message switch 1412 as they occur at the service 102. For example, when a user reads a single new e-mail message, an indication that the message has been read is transmitted to the message switch 1412. Similarly, when a user generates a new calendar entry, the new entry is automatically transmitted to the message switch 1412.

In one embodiment, the message switch 1412 groups the various individual message transactions together before transmitting them to the wireless device 130. If the wireless device 130 is actively connected to the wireless network, the message switch 1412 may group a certain number of message transactions together and/or may group all message transactions together occurring over a period of time before transmitting them as a group to the wireless device 130. While the wireless device 130 is not actively communicating over the wireless network, the message switch 1412 may combine all message transactions and transmit them as a group once the wireless device comes online. In one embodiment, the message switch 1412 and/or the batch processing logic 1400 may batch-process message transactions based on the batch processing parameters 1210 and 1220 described above with respect to FIG. 12.

In-Order Delivery

In order to fully synchronize a wireless device 130 with a service 102 as described herein, it is not only important that message transactions are reliably communicated to and from the wireless device but also that the message transactions are communicated in the proper order (e.g., in the same sequential order in which they occur at the service). For example, if a user creates a new folder at the service 102 and then moves several messages into the folder, the transaction creating the folder must be received by the wireless device before the move transaction.

While wireless networks such as Mobitex ensure reliable delivery of data, they do not necessarily ensure that the delivered data arrives in-order. Moreover, while network protocols such as the Transmission Control Protocol ("TCP") ensure in-order delivery of data, these protocols assume that both the sending node and the receiving node are always active and, therefore, are not necessarily adapted to a system in which one of the nodes (i.e., the wireless device) is inactive for extended periods.

Figure 14:
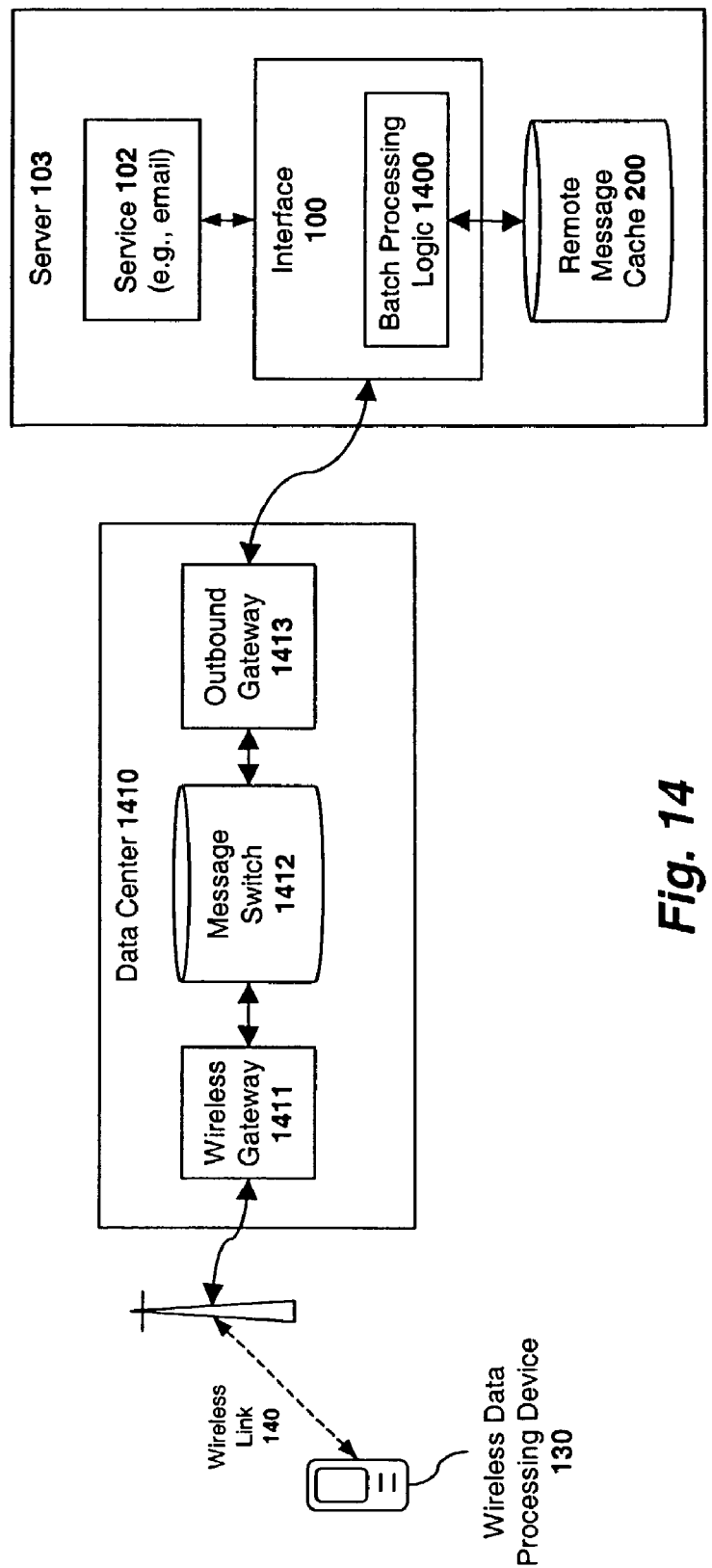
FIG. 14 illustrates an embodiment of the invention which employs multi-level batch processing.
Figure 15:
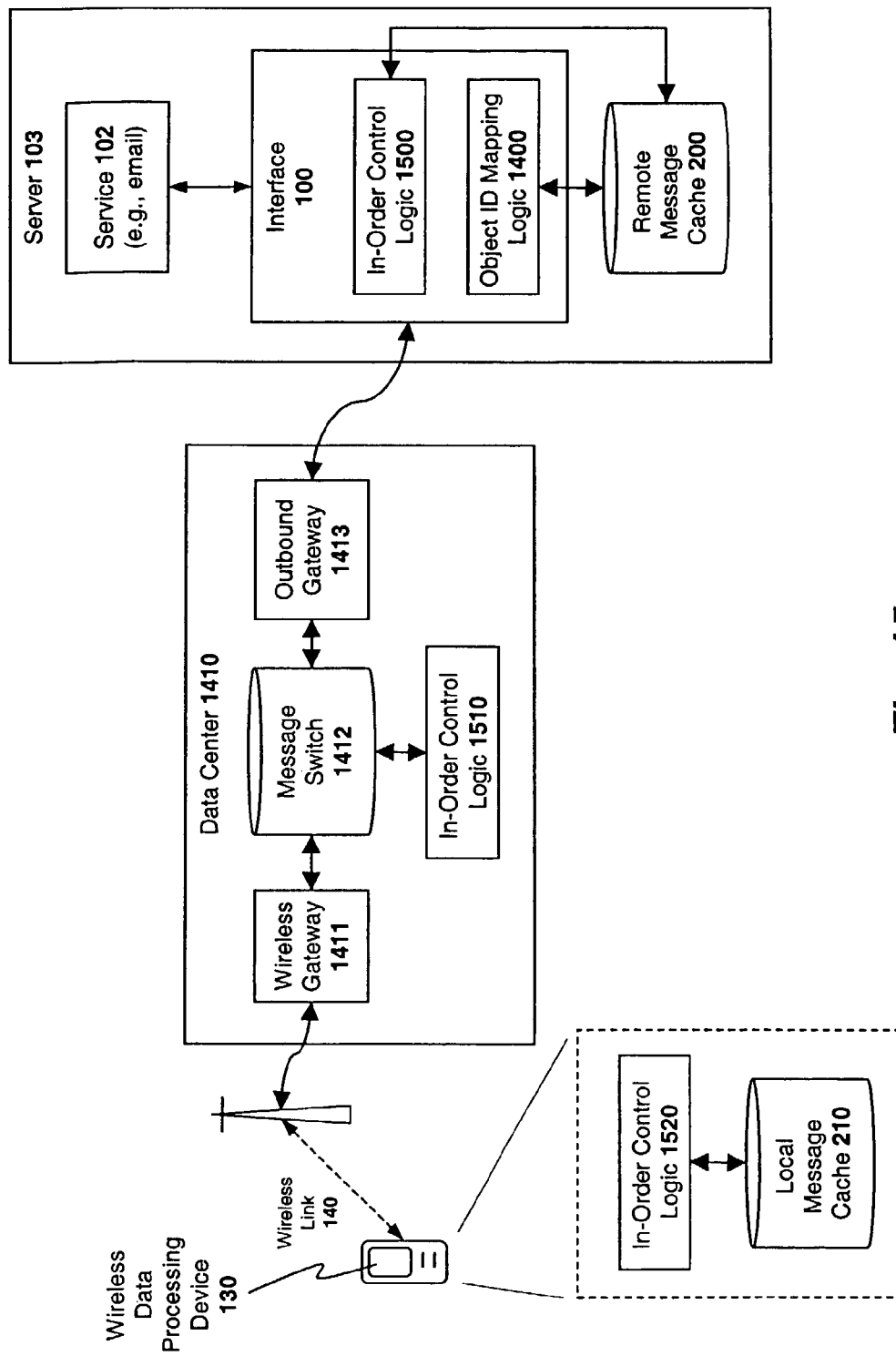
FIG. 15 illustrates an embodiment of the invention which employs in-order control functions.

As such, one embodiment of the invention illustrated in FIG. 14, employs in-order control logic 1500, 1510 and 1520 at the customer site, the data center and/or the wireless device, respectively, to ensure in-order delivery of message transactions. In operation, each message transaction at the customer site is assigned a sequential code which indicates the relative order in which the message transaction was generated. In one embodiment, when a series of message transactions are transmitted to the wireless device 130 (or transmitted from the wireless device 130 to the interface 100), the wireless device 130 (or the interface 100) will not execute a particular message transaction until it has received all previous sequential message transactions. Thus, if the wireless device 130 receives a series of message transactions coded sequentially from 1 to 3 and from 5 to 10, it may execute message transactions 1 to 3 but will not execute message transactions 5 to 10 until it receives message transaction 4.

In one embodiment, if the wireless device has not received message transaction 4 after some specified period of time (e.g., because the message transaction was lost during transmission), the wireless device 130 will send a request to the data center 1410 and/or the interface 100 to retransmit message transaction 4. The in-order control logic 1500 or 1510 executed at the interface 100 and/or the data center 1410, respectively, will then retransmit message transaction 4 from either the remote message cache 200 or the message switch 1412, respectively.

The wireless device 130 notifies the interface 100 and/or the message switch 1412 once it successfully receives message transaction 4, thereby allowing the message transaction to be removed from the remote message cache 200 and/or the message switch 1412 (i.e., assuming that other cache removal conditions described herein have been met). In one embodiment, the wireless device may send a block notification as opposed to an individual notification for each message transaction. For example, rather than simply sending a notification that it has received message transaction 4, the wireless device 130 may send a single notification that it has successfully received messages 1-10 (or some alternate number of message transactions), thereby allowing all messages to be cleared from remote message cache 200 and/or the message switch 1412 with a single notification. It should be noted that the sequential transaction numbers set forth above are for the purpose of illustration only. Various alternate sequential codes may be employed to indicate message transaction order while still complying with the underlying principles of the invention.

Identification Code Allocation

Each e-mail message, calendar entry, to-do list entry, . . . etc, is assigned a unique identification code by the service 102. For example, if the service is Microsoft Exchange, a 128-byte identification code is generated for each new data object. Accordingly, when fully synchronizing a wireless device 130 to the service 102, some mechanism must be provided to ensure that no duplicate identification codes are assigned for two distinct data objects. For example, if both the service 102 and the wireless device 130 are capable of independently generating data objects, they may both concurrently generate data objects with the same identification codes, resulting in a conflict.

One mechanism for solving this problem is to require the wireless device 130 to request a new identification code from the service 102 each time it generates a new data object. One potential problem with this scenario is that it may take an unreasonably long time for the wireless device 130 to acquire the identification code, depending on the speed of the wireless network. For example, several seconds may be considered an unreasonable amount of time to wait to begin entering a new e-mail message or calendar entry.

Alternatively, in one embodiment, the range of all possible data object codes are divided between the wireless device 130 and the service 103. In other words, a certain percentage (e.g., /1;2) of all possible codes are allocated to the wireless device 130 and the remaining possible codes are allocated to the service 103. In operation, when a new data object is generated at the wireless device (e.g., a new "to-do" list entry) the wireless device 130 will select a data object code only from within its pre-assigned range, thereby preventing a conflict at the service 102. In one particular embodiment, all negative codes are assigned to the wireless device 130 and all positive codes are assigned to the service 102. If a 32-bit (4-byte) code is used, this will result in 2,147,483,648 ($2^{31}$) negative codes and 2,147,483,648 ($2^{31}$) positive codes. It should be noted, however, that the particular manner in which codes are divided up is not pertinent to the underlying principles of the invention'.

Another potential problem which exists when fully synchronizing a wireless device with a service is that the standard data object identification codes employed by many services are unnecessarily large. As mentioned above, Microsoft Exchange generates a 128-byte (1024 bit) code to identify each unique data object.

Figure 16:
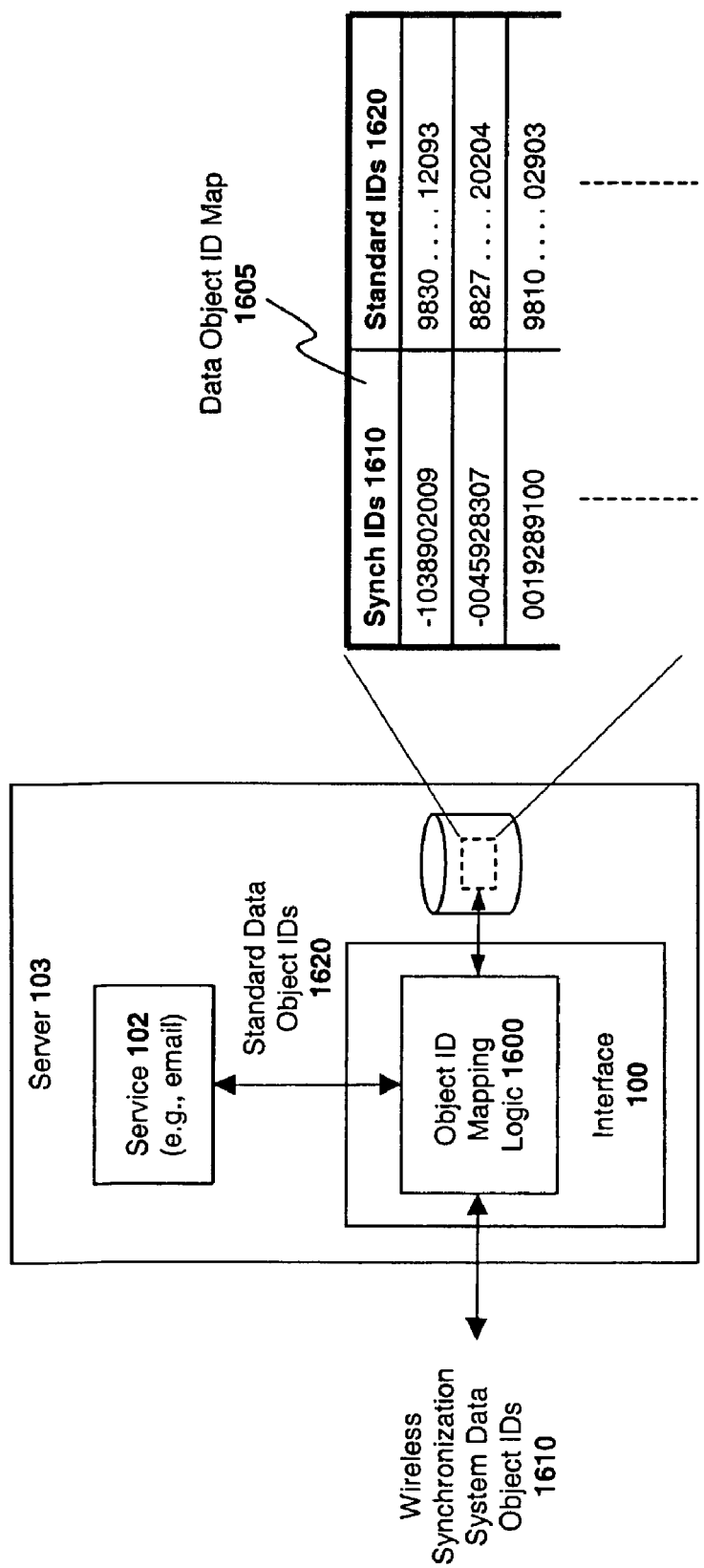
FIG. 16 illustrates an embodiment of the invention which maps synchronization identification codes to standard identification codes.

Accordingly, in one embodiment of the invention illustrated in FIG. 16, the interface 100 includes object identification code mapping logic 1600 for mapping standard data object identification codes 1620 (e.g., such as the 128-byte codes used by Microsoft Exchange) to data object identification codes 1610 generated specifically for use in the synchronization system described herein (hereinafter "synchronization system identification codes"). As illustrated, object identification code mapping logic 1600 maintains a data object identification table 1605 in which each standard identification code 1620 is associated with a corresponding synchronization system identification code 1610. As described above, in one embodiment, the synchronization system identification codes 1610 are 32-bits in length, thereby significantly reducing the amount of information transmitted across the wireless network. In addition, as indicated in FIG. 16, negative identification codes 1610 identify data objects created by the wireless device 130 and positive identification codes 1610 identify data objects created at the service 102 (e.g., from a local desktop PC).

Data Object Conflict Resolution

Because copies of data objects may be maintained at both the wireless device 130 and on the service 102, one embodiment of the invention employs techniques to ensure that concurrent modifications to the same data object at both the wireless device 130 and the service 102 are resolved in a logical manner. For example, in one embodiment, a version number is associated with each data object. Each time the data object is modified, the version code is changed to indicate the new version.

Figure 17:
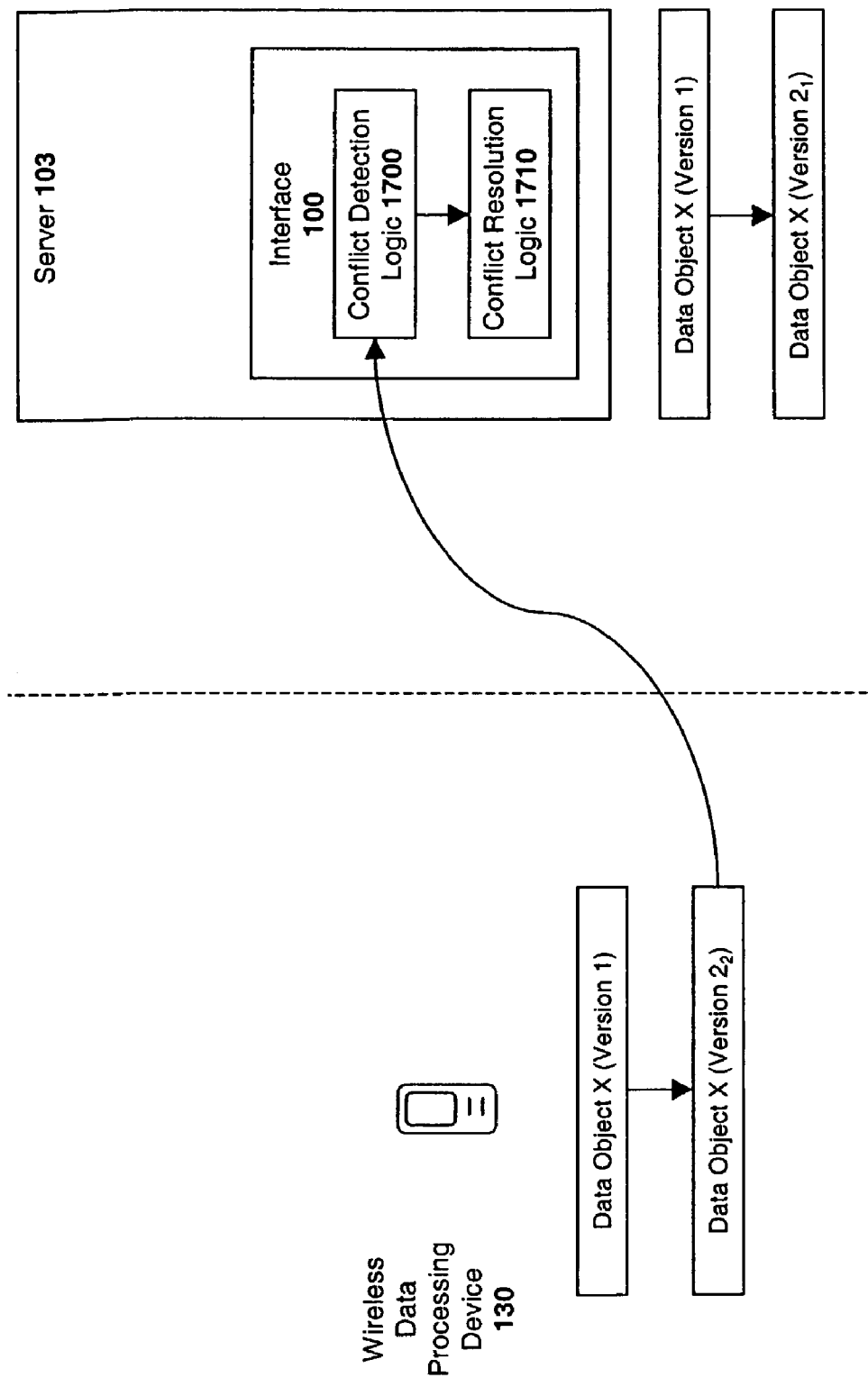
FIG. 17 illustrates an embodiment of the invention for detecting and resolving data object version conflicts.

In one embodiment, illustrated in FIG. 17, the interface 100 and the wireless data processing device 130 includes conflict detection logic 1700 and 1701, respectively, for detecting when a version conflict has occurred and conflict resolution logic 1710 for implementing one or more predefined conflict resolution techniques to resolve the version conflict. By way of example, in FIG. 17, a copy of Data Object X, Version 1 is initially stored on both the wireless device 130 and the service 102. Version 1 may be, for example, the initial version of a calendar entry or a to-do list entry. Both copies of Data Object X, Version 1 are concurrently modified at the service 102 and the wireless device 130 to generate Versions $2_1$ and $2_2$, respectively, producing a version conflict. One way in which this may occur is that a user modifies Data Object X at the wireless device 130 at the same time as the user' administrative assistant modifies Data Object X at the service 102. The wireless device 130 subsequently attempts to update the service 102 with Version $2_2$ and, likewise, the service 102 attempts to update the wireless device 130 with Version $2_1$.

In one embodiment, the conflict detection logic 1700, 1701 executed on the interface 100 and/or the wireless device 130, respectively, detects the version conflict. In response, the conflict detection logic 1700, 1701 triggers conflict resolution logic 1710, 1711 which attempts to resolve the conflict by applying one or more conflict resolution techniques. Various techniques may be employed to resolve the conflict. For example, in one embodiment, the version of the data object at the service 102 (Version $2_1$) is automatically retained, and the user is notified that his modification of the data object from the wireless device 130 will not be entered. The notification may be accompanied by a visual indication of the new version (Version $2_2$) and/or an explanation as to why the modification will not be entered. Alternatively, in one embodiment, the user may be prompted from the data processing device to select between the two potential versions. Upon making a selection, the selected version will be stored on both the wireless device 130 and the service 102. If another individual attempted to enter the non-selected version (e.g., the user's administrative assistant), then that individual may subsequently be notified. In one embodiment, the version which is selected is based on who entered it. For example, one embodiment of the invention may be configured to always accept the version generated by the user (i.e., and not the user's administrative assistant). Thus, if the user modifies Data Object X from either the wireless device 130 or directly at the service 102 (i.e., from a desktop connected to the service 102), the user's modifications will be accepted over any other modifications.

It should be noted that the specific conflict resolution techniques described above are for the purpose of illustration only. Various additional conflict resolution techniques may be employed by the conflict resolution logic 1710, 1711 while still complying with the underlying principles of the invention.

Full Wireless Synchronization and Zero Desktop Install

The advanced compression and message processing techniques described above allow the wireless device 130 to be fully synchronized with the service 102. For example, in one embodiment of the invention, all major components of the messaging service are completely synchronized on the wireless device 130. For example, if the service is Microsoft Exchange, these components will include e-mail, electronic calendar, contacts, tasks and notes. Accordingly, all user transactions (message filings, to-do list entries, . . . etc) are maintained up-to-date on the wireless device without the need for a cradle.

In one embodiment, not only are messages synchronized, but the entire state of the service 102 may be synchronized. This state information may include, for example, the creation of new folders, the deletion of old folders, filing of messages to folders, reading a message from the device, marking a message unread, e-mail deletions, arrival of new messages, copying of messages to a folder, filing of messages and/or any other transaction which has an effect on the mailbox maintained at the service.

In addition, in one embodiment, the wireless device 130 is provisioned wirelessly. Thus, once a user's account has been enabled on the service, all initial user data is sent wirelessly. This data may include, for example, initial contacts (e.g. address book), notes, tasks and calendar data. In one embodiment, a unique encryption key may initially be installed on the wireless device 130 to encrypt communication between the device and the service (e.g., by device installation software).

In one embodiment, even though the data on the wireless device 130 is completely synchronized, an aging algorithm may be employed to conserve space on the device. For example, at a given point in time, the service may be storing 40,000 data objects (e.g., e-mail messages, calendar entries, . . . etc), whereas, the wireless device (having a limited amount of memory) may only be capable of storing 20,000 data objects. Accordingly, in one embodiment, the wireless device 130 will store data objects which have not been modified or otherwise manipulated (e.g., moved from one folder to another) for the longest period of time. In one embodiment, the user may specify which types of messages should be automatically deleted (e.g., only messages in the "sent mail" folder, any messages over 1 month old, etc). Once a message has been removed from the device, however, it may always be recovered from the service.

For example, a user may request certain data objects to be re-transmitted from the service 102 based on one or more specified variables (e.g., creator, client, sender, recipient, date range, . . . etc). Similarly, in one embodiment, if the user manipulates a data object which has been deleted from the wireless device 130 from the user's desktop (e.g., moves an e-mail message from one folder to another) that data object will be re-transmitted to the wireless device and stored in the destination folder.

One embodiment of the invention maintains synchronization events even if any part of the system is "down" (e.g., the data network 170 and/or the wireless service provider network 171). For example, as described above, any synchronization events which occur during system downtime may be maintained in one of the batch processing caches 1412 or 200 at the data center 1410 and/or the interface 100, respectively. Thus, the interface 100 may be down for a period of time, the data network 170 may be unavailable, the wireless device 130 may be off, out of coverage or broken, and synchronization updates will still be maintained. Once all parts of the system are again working properly, the queued synchronization updates are processed.

Figure 18:
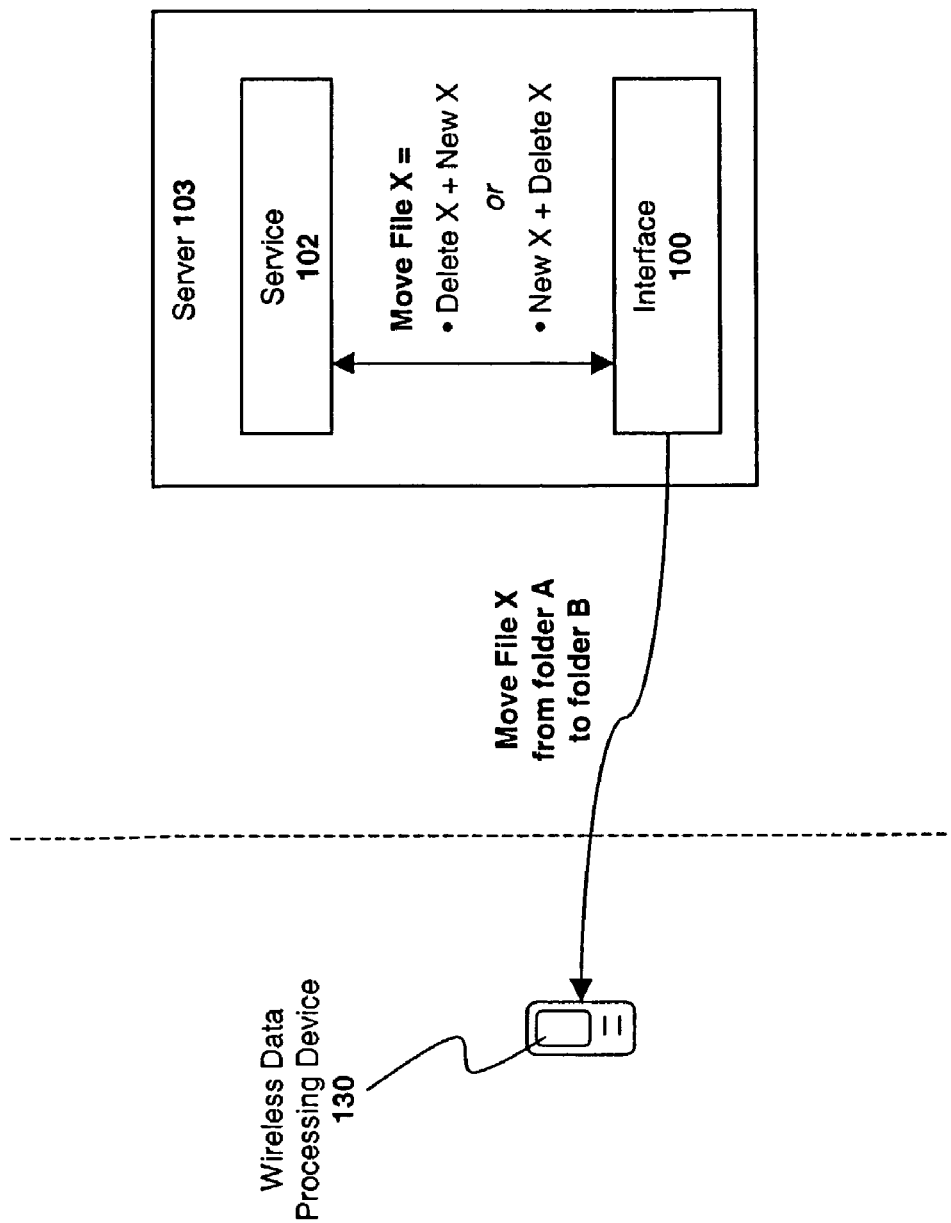
FIG. 18 illustrates an embodiment of the invention in which a move command is transmitted to a wireless device in lieu of a delete command and a new command.

In one embodiment of the interface 100, "move" events are detected and processed in an efficient manner. As indicated in FIG. 18 between the service 102 and the interface 100, when a message (or other data object) is moved from one folder to another on messaging systems such as Microsoft Exchange (e.g., from "sent mail" folder to a "saved mail" folder, from the "inbox" folder to a "read mail" folder, . . . etc), a new copy of the message is made in the location of the destination folder and the original message is then deleted from the source folder. Alternatively, the message may initially be deleted from the source folder and then re-created in the destination folder. Transmitting a delete command followed or preceded by a copy of the underlying message to the wireless device 130 is an inefficient way to perform move transactions. Accordingly, as indicated in FIG. 18, one embodiment of the interface 100 combines the "delete" and the "new" commands into a single "move" command using the data object (i.e., message) identification code, the source folder and/or the destination folder, thereby significantly reducing the amount of information transmitted across the wireless network.

Figure 19A:
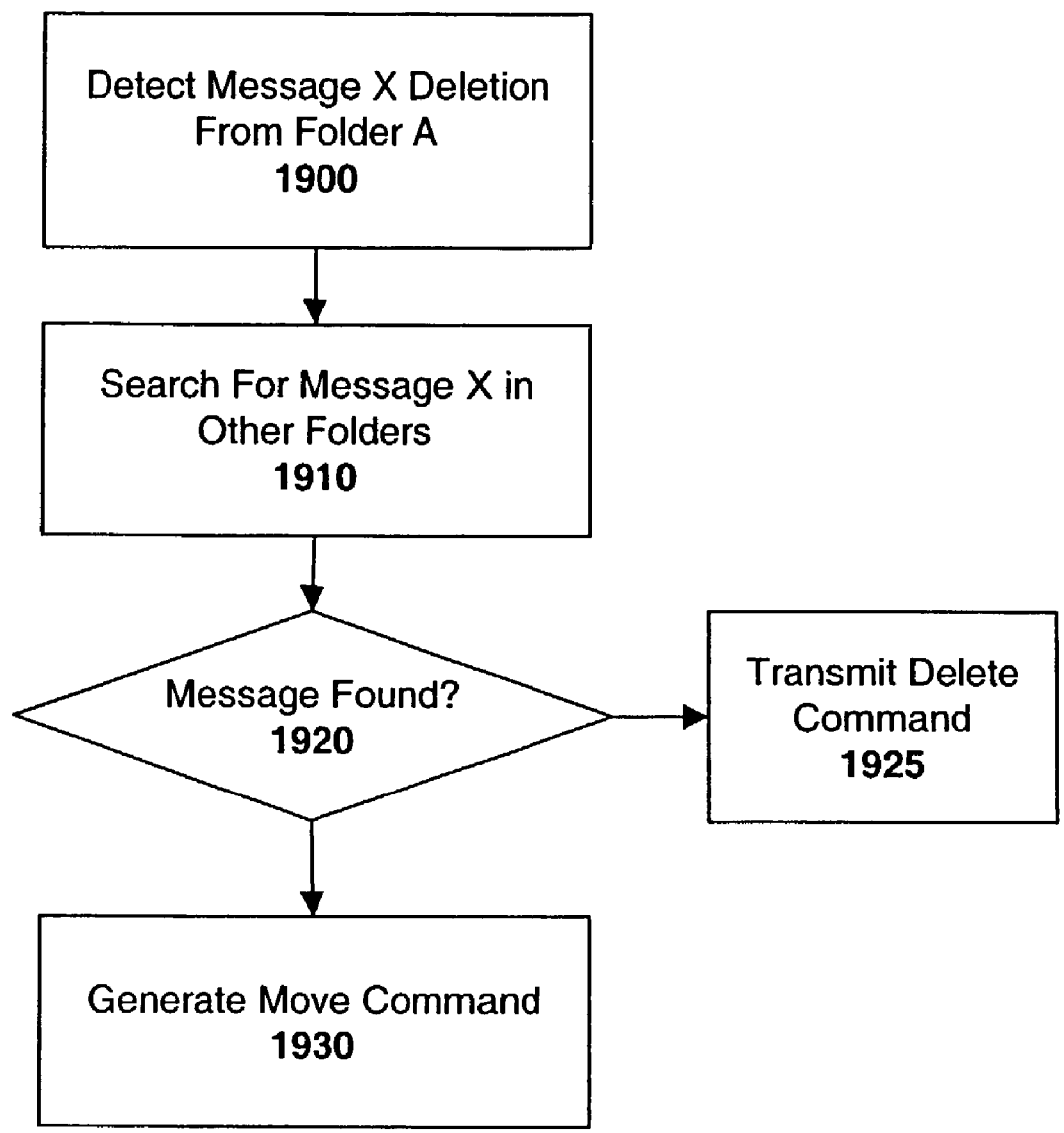
FIGS. 19a and b illustrate embodiments of a method for generating a move command.

In order to provide a move command to the wireless device 130 in this manner, the system (e.g., the interface 100) must first identify the message which is to be moved. One embodiment of the interface identifies the message using the methods set forth in FIG. 19a and/or FIG. 19b, either alone or in combination. Referring initially to FIG. 19a, at 1900 the interface 100 detects that Message X has been deleted from Folder A. At 1910, the interface 100 attempts to determine if the deletion forms part of a move command. As such, it searches other folders in the user's account to locate the same message. If it finds the same message in a particular folder, e.g., Folder B, it transmits a move command to the wireless device 130 at 1930 indicating that Message X should be moved from Folder A to Folder B. If, however, it does not locate Message X in another folder, it transmits a delete command to the wireless device indicating that Message X should be deleted from Folder A.

Figure 19B:
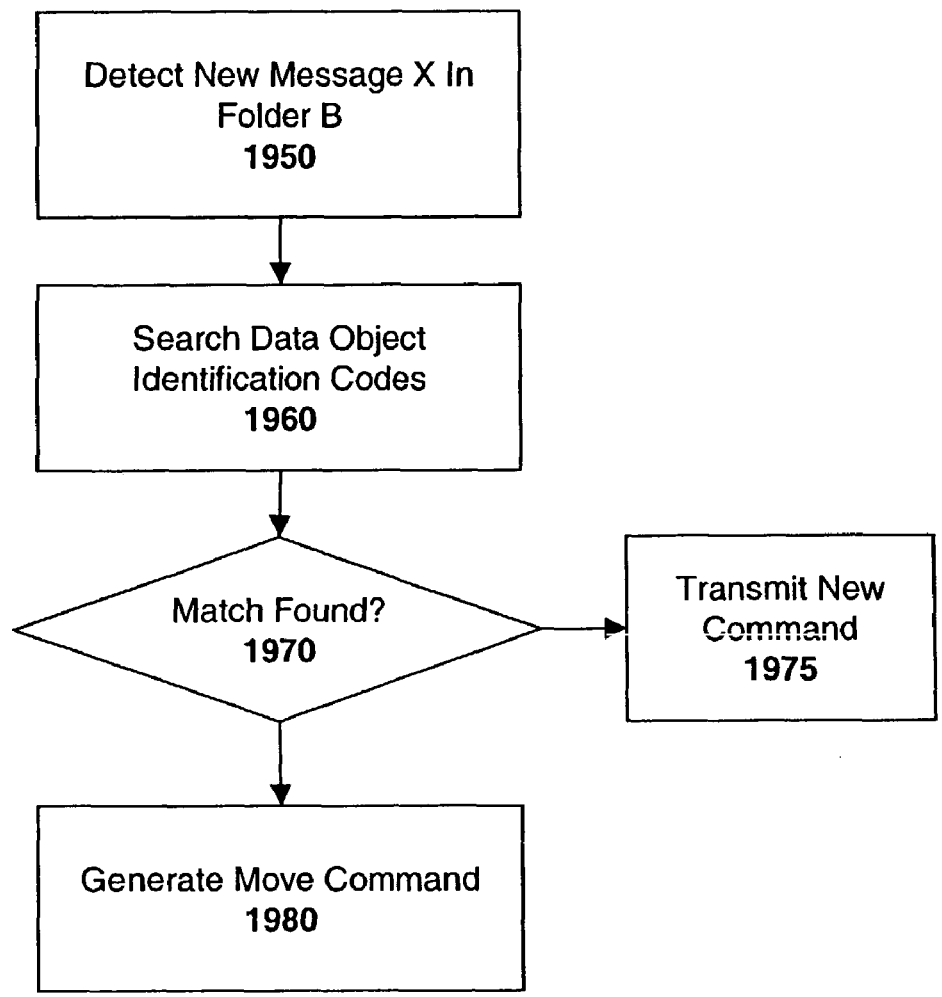

Referring now to FIG. 19b, in one embodiment, the interface 100 initially detects that Message X has arrived in Folder B. In response, the interface 100 searches the table of data object identification codes 1605 (see, e.g., FIG. 16) to locate a match for the identification code associated with the Message X. If a match is found (determined at 1970), then the interface 100 transmits a move command to the wireless device 130 indicating that Message X should be moved from Folder A to Folder B. If, however, the interface 100 does not locate an identification code match, it transmits a delete command to the wireless device indicating that Message X should be deleted from Folder A.

When a wireless device 130 has been "out-of-touch" with the service 102 for an extended period of time, a significant number of transactions may have accumulated which need to be synchronized. Accordingly, in one embodiment, in the interest of both saving bandwidth and time on the device (e.g. not swamping it with unsynchronized data), only representative portions of some data may be transmitted. For example, if the wireless device 130 has been off for two weeks, only message headers may be transmitted to the device (i.e., not the message bodies). The underlying reason for this is that the user will not likely want/need to read all of the older mail on the device.

In one embodiment, the specific manner in which data is transmitted to the device after an extended period of time may be selected by the user. Thus, the user may select a period of time after which only headers should be sent (e.g., older than 1 week, never, etc). In any case, the user may still request the full messages bodies after the headers have been transmitted.

As used herein, "zero desktop install" refers to the ability of the wireless device 130 to function normally without the installation of any client software on a user's desktop computer. One embodiment of the invention does not require a desktop because, as described above, all messaging features (e.g., management of device options, configuration of the messaging service, message filters, outgoing e-mail signatures, security settings, . . . etc) may be accessed by the wireless device. This feature is not available in current messaging systems because current wireless devices support only a subset of all messaging functions. As such, current systems require desktop software and a cradle to complete the synchronization process.

In one embodiment, the wireless device's configuration settings are stored and continually updated on the messaging server. Accordingly, if the device settings are ever lost (e.g., because the device is initialized or lost) the settings may be automatically recovered along with the messaging data. In fact, in one embodiment, the device does not ever need to be backed up because there is no data unique to the device that isn't synchronized to the messaging server.

In addition, in one embodiment, software upgrades are transmitted wirelessly to the device, thereby completely removing any required link between the device and a desktop. Software upgrades may include upgrades to the device's operating system as well as application installations.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while illustrated as an interface 100 to a service 102 executed on a server 103 (see FIG. 1), it will be appreciated that the underlying principles of the invention may be implemented on a single client in which the client transmits data over a network. Moreover, although described in the context of a wireless data processing device, the underlying principles of the invention may be implemented to compress data in virtually any networking environment, both wired and wireless. Accordingly, the scope and spirit of the invention should be judged in terms of the claims which follow.

What is claimed is:

1. A system comprising:
a wireless device to initiate first synchronization by automatically transmitting a first message update as a modification occurs to a first electronic mail (e-mail) message at the wireless device, and to initiate second synchronization by automatically transmitting a second message update as a modification occurs to a second e-mail message at the wireless device;
a wireless service provider network communicatively coupled to the wireless device;
a data center, communicatively coupled to the wireless service provider, to combine the first and second message updates received from the wireless device to form a block e-mail transaction
a data network coupled to the data center;
a server, communicatively coupled to the data network, having an interface to receive the block e-mail transaction from the data center and to transmit message updates to the wireless device.

2. The system of claim 1 wherein the server further comprises a cache to store the message updates prior to transmitting the message updates to the data center.

3. The system of claim 1 wherein the data center transmits an acknowledge message to the server upon receiving the message updates.

4. The system of claim 1 wherein the wireless device transmits an acknowledge message to the data center upon receiving a block e-mail transaction.

5. The system of claim 1 wherein the wireless device initiates synchronization with the interface by automatically transmitting a third message update as a modification occurs to a third e-mail message.

6. The system of claim 5 wherein the wireless device comprises batch processing logic to combine message updates to form a block e-mail transaction.

7. The system of claim 6 wherein the data center comprises a message switch that stores a block e-mail transaction received from the wireless device prior to transmitting the block e-mail transaction to the server.

8. The system of claim 7 wherein the data center further comprises:
an outbound gateway coupled to the message switch and communicatively coupled to the server; and
a wireless gateway coupled to the message switch and communicatively coupled to the wireless device.

9. The system of claim 5 wherein each of the message updates include an identification code upon generation, the identification code indicating the sequence in which the e-mail messages were generated.

10. The system of claim 9 wherein the wireless device comprises:
a cache to store the received message updates until the e-mail messages have been executed; and
in-order control logic to examine the identification code of the received message updates to determine if all of the data transactions have been received.

11. The system of claim 10 wherein upon receiving a series of message updates the wireless device executes the received message updates in order based upon the sequence of identification codes.

12. The system of claim 10 wherein upon receiving the series of message updates the wireless device delays the execution of a message update with a first identification code until one or more message updates with previous sequential identification codes have been received.

13. The system of claim 9 wherein the in-order control logic transmits a request to the data center to retransmit message updates that have not been received within a predetermined time period.

14. The system of claim 9 wherein the server comprises in-order control logic to examine the identification code of the received message updates to determine if all of the message updates have been received.

15. The system of claim 14 wherein upon receiving a series of message updates the messaging service application executes the received message updates in order based upon the sequence of identification codes.

16. The system of claim 15 wherein upon the server receiving the series of message updates the messaging service application delays the execution of a message updates with a first identification code until one or more message updates with previous sequential identification codes have been received.

17. The system of claim 14 wherein the in-order control logic transmits a request to the data center to retransmit message updates that have not been received within a predetermined time period.

18. The system of claim 17 wherein the server comprises:
a cache to store the received message updates until the message updates have been executed; and
in-order control logic to examine the identification code of the received message updates to determine if all of the e-mail messages have been received.

19. The system of claim 18 wherein upon the server receiving a series of message updates the messaging service application executes the received message updates in order based upon the sequence of identification codes.

20. The system of claim 19 wherein upon the server receiving the series of message updates the messaging service application delays the execution of a message updates with a first identification code until one or more message updates with previous sequential identification codes have been received.

21. The system of claim 18 wherein the in-order control logic transmits a request to the data center to retransmit message updates that have not been received within a predetermined time period.

22. The system of claim 1 wherein the server further comprises batch processing logic, Coupled to the messaging service application, to message updates to form a block e-mail transaction.

23. The system of claim 22 wherein the server further comprises a cache to store block transactions prior to transmitting the block e-mail transactions to the data center.

24. A system comprising:
a wireless device to initiate first synchronization with a messaging server by automatically transmitting a first message update as a modification occurs to a first electronic mail (e-mail) message at the wireless device, and to initiate second synchronization with the messaging server by automatically transmitting a second message update as a modification occurs to a second e-mail message at the wireless device;
a data center, communicatively coupled to the wireless device, to combine the first and second message updates received from the wireless device to form a block e-mail transaction and to transmit the block email transaction to the messaging server.

25. The system of claim 24 wherein the wireless device further comprises a cache to store data transactions prior to transmitting the e-mail messages to the data center.

26. The system of claim 24 wherein the messaging server initiates synchronization with the wireless device by automatically transmitting a third message update as a modification occurs to a third e-mail message.

27. The system of claim 24 wherein the data center comprises a message switch to store the first and second message updates received from the wireless device prior to transmitting the block e-mail transaction to the server.

28. The system of claim 24 wherein the data center further comprises:
an outbound gateway coupled to a message switch and the server; and
a wireless gateway coupled to the message switch and the wireless device.

29. The system of claim 24 wherein the messaging server comprises batch processing logic to combine two or more e-mail messages to form a block e-mail transaction.

30. The system of claim 29 wherein the messaging server further comprises a cache to store block transactions prior to transmitting the block e-mail transactions to the data center.

* * * * *